United States Patent
Xu

(10) Patent No.: US 12,297,922 B1
(45) Date of Patent: May 13, 2025

(54) VALVE SEAT WITH EMBEDDED STRUCTURE AND RELATED METHODS

(71) Applicant: Vulcan Industrial Holdings, LLC, Houston, TX (US)

(72) Inventor: Zhiyue Xu, Cypress, TX (US)

(73) Assignee: Vulcan Industrial Holdings, LLC, Houston, TX (US)

( * ) Notice: Subject to any disclaimer, the term of this patent is extended or adjusted under 35 U.S.C. 154(b) by 79 days.

(21) Appl. No.: 18/117,615

(22) Filed: Mar. 6, 2023

Related U.S. Application Data

(60) Provisional application No. 63/316,766, filed on Mar. 4, 2022.

(51) Int. Cl.
*F16K 25/00* (2006.01)

(52) U.S. Cl.
CPC .................................. *F16K 25/005* (2013.01)

(58) Field of Classification Search
CPC .................................................... F16K 25/005
See application file for complete search history.

(56) References Cited

U.S. PATENT DOCUMENTS

| | | |
|---|---|---|
| 1,316,539 A | 9/1919 | Ford |
| 1,364,848 A | 1/1921 | Walsh |
| 1,576,269 A | 3/1926 | Durant |
| 1,595,459 A | 8/1926 | Durant |
| 1,671,139 A | 5/1928 | Wilson |
| 1,836,068 A | 12/1931 | Goldsberry |
| 1,873,318 A | 8/1932 | Eason |
| 1,914,737 A | 6/1933 | Elms |
| 1,948,628 A | 2/1934 | Penick |
| 1,963,684 A | 6/1934 | Shimer |
| 1,963,685 A | 6/1934 | Shimer |
| 2,011,547 A | 8/1935 | Campbell |
| 2,069,443 A | 2/1937 | Hill |
| 2,103,504 A | 12/1937 | White |
| 2,143,399 A | 1/1939 | Abercrombie |
| 2,146,709 A | 2/1939 | Bird |
| 2,151,442 A | 3/1939 | Hardy |
| 2,163,472 A | 6/1939 | Shimer |

(Continued)

FOREIGN PATENT DOCUMENTS

| | | |
|---|---|---|
| CN | 2556355 Y | 6/2003 |
| CN | 201149099 | 11/2008 |

(Continued)

OTHER PUBLICATIONS

International Search Report and Written Opinion for international application No. PCT/US2023/073458, mailed Feb. 1, 2024.

(Continued)

*Primary Examiner* — Moshe Wilensky

(74) *Attorney, Agent, or Firm* — Womble Bond Dickinson (US) LLP

(57) ABSTRACT

An embodiment of a valve seat for a pumping assembly includes a body having a bore. In addition, the valve seat includes an embedded structure embedded in the body so as to define, at least partially, a strike face of the valve seat. The strike face extends circumferentially about the bore, and the embedded structure includes a gradient material structure having a first material, a second material spaced from the first material, and a compositional transition region between the first material and the second material.

45 Claims, 16 Drawing Sheets

(56) References Cited

U.S. PATENT DOCUMENTS

| | | |
|---|---|---|
| 2,252,488 A | 8/1941 | Bierend |
| 2,304,991 A | 12/1942 | Foster |
| 2,506,128 A | 5/1950 | Ashton |
| 2,539,996 A | 1/1951 | Gleitz |
| 2,547,831 A | 4/1951 | Mueller |
| 2,713,522 A | 7/1955 | Lorenz |
| 2,719,737 A | 10/1955 | Fletcher |
| 2,745,631 A | 5/1956 | Shellman |
| 2,756,960 A | 7/1956 | Church |
| 2,898,082 A | 8/1959 | Almen |
| 2,969,951 A | 1/1961 | Walton |
| 2,977,874 A | 4/1961 | Ritzerfeld et al. |
| 2,982,515 A | 5/1961 | Clinton |
| 2,983,281 A | 5/1961 | Bynum |
| 3,049,082 A | 8/1962 | Barry |
| 3,053,500 A | 9/1962 | Atkinson |
| 3,063,467 A | 11/1962 | Roberts, Jr. |
| 3,224,817 A | 12/1965 | Carter |
| 3,276,390 A | 10/1966 | Bloudoff |
| 3,277,837 A | 10/1966 | Pangburn |
| 3,288,475 A | 11/1966 | Benoit |
| 3,459,363 A | 8/1969 | Miller |
| 3,474,808 A | 10/1969 | Elliott |
| 3,483,885 A | 12/1969 | Leathers |
| 3,489,098 A | 1/1970 | Roth |
| 3,489,170 A | 1/1970 | Leman |
| 3,512,787 A | 5/1970 | Kennedy |
| 3,590,387 A | 6/1971 | Landis |
| 3,640,501 A | 2/1972 | Walton |
| 3,698,726 A | 10/1972 | Schettler |
| 3,809,508 A | 5/1974 | Uchiyama |
| 3,847,511 A | 11/1974 | Cole |
| 3,907,307 A | 9/1975 | Maurer |
| 3,931,755 A | 1/1976 | Hatridge |
| 4,044,834 A | 8/1977 | Perkins |
| 4,076,212 A | 2/1978 | Leman |
| 4,184,814 A | 1/1980 | Parker |
| 4,219,204 A | 8/1980 | Pippert |
| 4,277,229 A | 7/1981 | Pacht |
| 4,306,728 A | 12/1981 | Huperz |
| 4,331,741 A | 5/1982 | Wilson |
| 4,395,050 A | 7/1983 | Wirz |
| 4,398,731 A | 8/1983 | Gorman |
| 4,440,404 A | 4/1984 | Roach |
| 4,500,267 A | 2/1985 | Birdwell |
| 4,508,133 A | 4/1985 | Hamid |
| 4,518,359 A | 5/1985 | Yao-Psong |
| 4,527,806 A | 7/1985 | Ungchusri |
| 4,565,297 A | 1/1986 | Korner |
| 4,662,392 A | 5/1987 | Vadasz |
| 4,754,950 A | 7/1988 | Tada |
| 4,763,876 A | 8/1988 | Oda |
| 4,768,933 A | 9/1988 | Stachowiak |
| 4,770,206 A | 9/1988 | Sjoberg |
| 4,807,890 A | 2/1989 | Gorman |
| 4,811,758 A | 3/1989 | Piper |
| 4,861,241 A | 8/1989 | Gamboa |
| 4,872,395 A | 10/1989 | Bennitt et al. |
| 4,878,815 A | 11/1989 | Stachowiak |
| 4,919,719 A | 4/1990 | Abe |
| 4,951,707 A | 8/1990 | Johnson |
| 5,020,490 A | 6/1991 | Seko |
| 5,052,435 A | 10/1991 | Crudup |
| 5,061,159 A | 10/1991 | Pryor |
| 5,062,450 A | 11/1991 | Bailey |
| 5,073,096 A | 12/1991 | King et al. |
| 5,080,713 A | 1/1992 | Ishibashi |
| 5,088,521 A | 2/1992 | Johnson |
| 5,127,807 A | 7/1992 | Eslinger |
| 5,131,666 A | 7/1992 | Hutchens |
| 5,135,238 A | 8/1992 | Wells |
| 5,149,107 A | 9/1992 | Maringer |
| 5,201,491 A | 4/1993 | Domangue |
| 5,209,495 A | 5/1993 | Palmour |
| 5,249,600 A | 10/1993 | Blume |
| 5,267,736 A | 12/1993 | Pietsch |
| 5,273,570 A | 12/1993 | Sato |
| 5,299,812 A | 4/1994 | Brestel |
| 5,314,659 A | 5/1994 | Hidaka |
| 5,362,215 A | 11/1994 | King |
| 5,382,057 A | 1/1995 | Richter |
| 5,478,048 A | 12/1995 | Salesky |
| 5,493,951 A | 2/1996 | Harrison |
| 5,533,245 A | 7/1996 | Stanton |
| 5,540,570 A | 7/1996 | Schuller |
| 5,572,920 A | 11/1996 | Kennedy |
| 5,626,345 A | 5/1997 | Wallace |
| 5,636,688 A | 6/1997 | Bassinger |
| 5,674,449 A | 10/1997 | Liang |
| 5,834,664 A | 11/1998 | Aonuma |
| 5,859,376 A | 1/1999 | Ishibashi |
| 5,895,517 A | 4/1999 | Kawamura |
| 5,924,853 A | 7/1999 | Pacht |
| 5,949,003 A | 9/1999 | Aoki |
| 6,139,599 A | 10/2000 | Takahashi |
| 6,200,688 B1 | 3/2001 | Liang |
| 6,209,445 B1 | 4/2001 | Roberts, Jr |
| 6,328,312 B1 | 12/2001 | Schmitz |
| 6,340,377 B1 | 1/2002 | Kawata |
| 6,382,940 B1 | 5/2002 | Blume |
| 6,436,338 B1 | 8/2002 | Qiao |
| 6,446,939 B1 | 9/2002 | Hoppe |
| 6,460,620 B1 | 10/2002 | LaFleur |
| 6,464,749 B1 | 10/2002 | Kawase |
| 6,482,275 B1 | 11/2002 | Qiao |
| 6,485,678 B1 | 11/2002 | Liang |
| 6,544,012 B1 | 4/2003 | Blume |
| 6,571,684 B1 | 6/2003 | Nov et al. |
| 6,623,259 B1 | 9/2003 | Blume |
| 6,634,236 B2 | 10/2003 | Mars |
| 6,641,112 B2 | 11/2003 | Antoff |
| 6,695,007 B2 | 2/2004 | Vicars |
| 6,702,905 B1 | 3/2004 | Qiao |
| 6,880,802 B2 | 4/2005 | Hara |
| 6,910,871 B1 | 6/2005 | Blume |
| 6,916,444 B1 | 7/2005 | Liang |
| 6,951,165 B2 | 10/2005 | Kuhn |
| 6,951,579 B2 | 10/2005 | Koyama |
| 6,955,181 B1 | 10/2005 | Blume |
| 6,959,916 B2 | 11/2005 | Chigasaki |
| 7,000,632 B2 | 2/2006 | McIntire |
| 7,036,824 B2 | 5/2006 | Kunz |
| 7,144,440 B2 | 12/2006 | Ando |
| 7,168,440 B1 | 1/2007 | Blume |
| 7,186,097 B1 | 3/2007 | Blume |
| 7,222,837 B1 | 5/2007 | Blume |
| 7,290,560 B2 | 11/2007 | Orr |
| 7,296,591 B2 | 11/2007 | Moe |
| 7,335,002 B2 | 2/2008 | Vicars |
| 7,341,435 B2 | 3/2008 | Vicars |
| 7,398,955 B2 | 7/2008 | Weingarten |
| 7,506,574 B2 | 3/2009 | Jensen |
| 7,513,483 B1 | 4/2009 | Blume |
| 7,513,759 B1 | 4/2009 | Blume |
| 7,562,675 B2 | 7/2009 | Nomichi et al. |
| 7,611,590 B2 | 11/2009 | Liang |
| 7,681,589 B2 | 3/2010 | Schwegman |
| 7,682,471 B2 | 3/2010 | Levin |
| 7,726,026 B1 | 6/2010 | Blume |
| 7,748,310 B2 | 7/2010 | Kennedy |
| 7,754,142 B2 | 7/2010 | Liang |
| 7,754,143 B2 | 7/2010 | Qiao |
| 7,757,396 B2 | 7/2010 | Sawada |
| 7,789,133 B2 | 9/2010 | McGuire |
| 7,789,161 B2 | 9/2010 | Riley |
| 7,793,913 B2 | 9/2010 | Hara |
| 7,828,053 B2 | 11/2010 | McGuire |
| 7,845,413 B2 | 12/2010 | Shampine |
| 7,861,738 B2 | 1/2011 | Erbes |
| 7,866,346 B1 | 1/2011 | Walters |
| 7,891,374 B2 | 2/2011 | Vicars |
| 7,954,510 B2 | 6/2011 | Schwegman |
| 7,992,635 B2 | 8/2011 | Cherewyk |
| 8,069,923 B2 | 12/2011 | Blanco |

(56) References Cited

U.S. PATENT DOCUMENTS

| | | |
|---|---|---|
| 8,075,661 B2 | 12/2011 | Chen |
| 8,083,506 B2 | 12/2011 | Maki |
| 8,100,407 B2 | 1/2012 | Stanton |
| 8,141,849 B1 | 3/2012 | Blume |
| 8,147,227 B1 | 4/2012 | Blume |
| 8,181,970 B2 | 5/2012 | Smith |
| 8,261,771 B2 | 9/2012 | Witkowski |
| 8,287,256 B2 | 10/2012 | Shafer |
| 8,291,927 B2 | 10/2012 | Johnson |
| 8,317,498 B2 | 11/2012 | Gambier |
| 8,375,980 B2 | 2/2013 | Higashiyama |
| 8,376,723 B2 | 2/2013 | Kugelev |
| 8,402,880 B2 | 3/2013 | Patel |
| 8,430,075 B2 | 4/2013 | Qiao |
| D687,125 S | 7/2013 | Hawes |
| 8,479,700 B2 | 7/2013 | Qiao |
| 8,511,218 B2 | 8/2013 | Cordes |
| 8,522,667 B2 | 9/2013 | Clemens |
| 8,528,585 B2 | 9/2013 | McGuire |
| 8,529,230 B1 | 9/2013 | Colley, III et al. |
| 8,534,691 B2 | 9/2013 | Schaffer |
| 8,613,886 B2 | 12/2013 | Qiao |
| D700,682 S | 3/2014 | Bayyouk et al. |
| 8,662,864 B2 | 3/2014 | Bayyouk |
| 8,662,865 B2 | 3/2014 | Bayyouk |
| 8,668,470 B2 | 3/2014 | Bayyouk |
| 8,707,853 B1 | 4/2014 | Dille |
| 8,733,313 B2 | 5/2014 | Sato |
| 8,784,081 B1 | 7/2014 | Blume |
| 8,828,312 B2 | 9/2014 | Yao |
| 8,870,554 B2 | 10/2014 | Kent |
| 8,893,806 B2 | 11/2014 | Williamson |
| 8,894,392 B1 | 11/2014 | Blume |
| 8,915,722 B1 | 12/2014 | Blume |
| 8,940,110 B2 | 1/2015 | Qiao |
| 8,978,695 B2 | 3/2015 | Witkowkski |
| 8,998,593 B2 | 4/2015 | Vicars |
| 9,010,412 B2 | 4/2015 | McGuire |
| 9,103,448 B2 | 8/2015 | Witkowski |
| 9,150,945 B2 | 10/2015 | Bei |
| 9,157,136 B2 | 10/2015 | Chou |
| 9,157,468 B2 | 10/2015 | Dille |
| 9,206,910 B2 | 12/2015 | Kahn |
| D748,228 S | 1/2016 | Bayyouk |
| 9,260,933 B2 | 2/2016 | Artherholt |
| 9,261,195 B2 | 2/2016 | Toynbee |
| 9,273,543 B2 | 3/2016 | Baca |
| 9,284,631 B2 | 3/2016 | Radon |
| 9,284,953 B2 | 3/2016 | Blume |
| 9,285,040 B2 | 3/2016 | Forrest |
| 9,291,274 B1 | 3/2016 | Blume |
| 9,322,243 B2 | 4/2016 | Baca |
| 9,334,547 B2 | 5/2016 | Qiao |
| 9,340,856 B2 | 5/2016 | Otobe |
| 9,359,921 B2 | 6/2016 | Hashimoto |
| 9,365,913 B2 | 6/2016 | Imaizumi |
| 9,371,919 B2 | 6/2016 | Forrest |
| 9,376,930 B2 | 6/2016 | Kim |
| 9,377,019 B1 | 6/2016 | Blume |
| 9,382,940 B2 | 7/2016 | Lee |
| 9,416,887 B2 | 8/2016 | Blume |
| 9,435,454 B2 | 9/2016 | Blume |
| 9,441,776 B2 | 9/2016 | Bryne |
| 9,458,743 B2 | 10/2016 | Qiao |
| 9,464,730 B2 | 10/2016 | Bihlet |
| 9,500,195 B2 | 11/2016 | Blume |
| 9,506,382 B2 | 11/2016 | Yeager |
| 9,528,508 B2 | 12/2016 | Thomeer |
| 9,528,631 B2 | 12/2016 | McCarty |
| 9,534,473 B2 | 1/2017 | Morris |
| 9,534,691 B2 | 1/2017 | Miller |
| 9,556,761 B2 | 1/2017 | Koyama |
| 9,568,138 B2 | 2/2017 | Arizpe |
| 9,605,767 B2 | 3/2017 | Chhabra |
| 9,631,739 B2 | 4/2017 | Belshan |
| D787,029 S | 5/2017 | Bayyouk |
| 9,638,075 B2 | 5/2017 | Qiao |
| 9,638,337 B2 | 5/2017 | Witkowski |
| 9,650,882 B2 | 5/2017 | Zhang |
| 9,651,067 B2 | 5/2017 | Beschorner |
| 9,689,364 B2 | 6/2017 | Mack |
| 9,695,812 B2 | 7/2017 | Dille |
| 9,732,746 B2 | 8/2017 | Chandrasekaran |
| 9,732,880 B2 | 8/2017 | Haines |
| 9,745,968 B2 | 8/2017 | Kotapish |
| 9,784,262 B2 | 10/2017 | Bayyouk |
| 9,791,082 B2 | 10/2017 | Baxter et al. |
| 9,822,894 B2 | 11/2017 | Bayyouk et al. |
| 9,845,801 B1 | 12/2017 | Shek |
| 9,857,807 B2 | 1/2018 | Baca |
| 9,915,250 B2 | 3/2018 | Brasche |
| 9,920,615 B2 | 3/2018 | Zhang |
| 9,927,036 B2 | 3/2018 | Dille |
| 9,945,362 B2 | 4/2018 | Skurdalsvold |
| 9,945,375 B2 | 4/2018 | Zhang |
| 9,989,044 B2 | 6/2018 | Bayyouk |
| 10,029,540 B2 | 7/2018 | Seeger |
| D826,281 S | 8/2018 | Mead |
| 10,041,490 B1 | 8/2018 | Jahnke |
| 10,082,137 B2 | 9/2018 | Graham |
| 10,094,478 B2 | 10/2018 | Tijima |
| 10,113,679 B2 | 10/2018 | Shuck |
| 10,184,470 B2 | 1/2019 | Barnett, Jr. |
| 10,190,197 B2 | 1/2019 | Baker |
| 10,197,172 B2 | 2/2019 | Fuller |
| 10,215,172 B2 | 2/2019 | Wood |
| 10,221,848 B2 | 3/2019 | Bayyouk |
| 10,240,594 B2 | 3/2019 | Barnhouse, Jr. |
| 10,240,597 B2 | 3/2019 | Bayyouk |
| 10,247,182 B2 | 4/2019 | Zhang |
| 10,247,184 B2 | 4/2019 | Chunn |
| 10,273,954 B2 | 4/2019 | Brown |
| 10,288,178 B2 | 5/2019 | Nowell |
| 10,316,832 B2 | 6/2019 | Byrne |
| 10,330,097 B2 | 6/2019 | Skurdalsvold |
| 10,344,757 B1 | 7/2019 | Stark |
| 10,364,487 B2 | 7/2019 | Park |
| D856,498 S | 8/2019 | Bayyouk |
| 10,378,535 B2 | 8/2019 | Mahmood |
| 10,378,538 B2 | 8/2019 | Blume |
| 10,378,659 B2 | 8/2019 | Scott et al. |
| 10,393,113 B2 | 8/2019 | Wagner |
| 10,400,764 B2 | 9/2019 | Wagner |
| 10,415,348 B2 | 9/2019 | Zhang |
| D861,834 S | 10/2019 | Foster et al. |
| 10,428,406 B2 | 10/2019 | Yao |
| 10,428,949 B2 | 10/2019 | Miller |
| 10,436,193 B1 | 10/2019 | Jahnke |
| 10,443,456 B2 | 10/2019 | Hoeg |
| 10,465,680 B1 | 11/2019 | Guerra |
| 10,472,702 B2 | 11/2019 | Yeh |
| 10,487,528 B2 | 11/2019 | Pozybill |
| D871,455 S | 12/2019 | Crowsley |
| 10,519,070 B2 | 12/2019 | Sanders |
| 10,519,950 B2 | 12/2019 | Foster |
| 10,526,862 B2 | 1/2020 | Witkowski |
| 10,527,036 B2 | 1/2020 | Blume |
| 10,557,446 B2 | 2/2020 | Stecklein |
| 10,557,576 B2 | 2/2020 | Witkowski |
| 10,557,580 B2 | 2/2020 | Mendyk |
| 10,563,494 B2 | 2/2020 | Graham |
| 10,563,649 B2 | 2/2020 | Zhang |
| 10,570,491 B2 | 2/2020 | Hong |
| 10,576,538 B2 | 3/2020 | Kato |
| 10,577,580 B2 | 3/2020 | Abbas |
| 10,577,850 B2 | 3/2020 | Ozkan |
| 10,591,070 B2 | 3/2020 | Nowell |
| 10,605,374 B2 | 3/2020 | Takaki |
| D880,661 S | 4/2020 | Foster et al. |
| 10,626,856 B2 | 4/2020 | Coldren |
| 10,633,925 B2 | 4/2020 | Panda |
| 10,634,260 B2 | 4/2020 | Said |
| 10,640,854 B2 | 5/2020 | Hu |
| 10,655,623 B2 | 5/2020 | Blume |

(56) References Cited

U.S. PATENT DOCUMENTS

| | | |
|---|---|---|
| 10,663,071 B2 | 5/2020 | Bayyouk |
| 10,670,013 B2 | 6/2020 | Foster |
| 10,670,153 B2 | 6/2020 | Filipow |
| 10,670,176 B2 | 6/2020 | Byrne |
| 10,677,109 B2 | 6/2020 | Qiao |
| 10,677,240 B2 | 6/2020 | Graham |
| 10,677,365 B2 | 6/2020 | Said |
| 10,711,567 B2 | 7/2020 | Buckley |
| 10,711,754 B2 | 7/2020 | Nelson |
| 10,711,778 B2 | 7/2020 | Buckley |
| 10,718,441 B2 | 7/2020 | Myers |
| 10,731,523 B2 | 8/2020 | Qu |
| 10,731,643 B2 | 8/2020 | DeLeon |
| 10,738,928 B2 | 8/2020 | Arizpe |
| 10,753,490 B2 | 8/2020 | Fuller |
| 10,753,495 B2 | 8/2020 | Bayyouk |
| 10,767,520 B1 | 9/2020 | Hattiangadi |
| 10,771,567 B2 | 9/2020 | Sundaresan |
| 10,774,828 B1 | 9/2020 | Smith |
| 10,781,803 B2 | 9/2020 | Kumar |
| 10,787,725 B2 | 9/2020 | Fujieda |
| 10,801,627 B2 | 10/2020 | Warbey |
| 10,808,488 B2 | 10/2020 | Witkowski |
| 10,808,851 B1 | 10/2020 | Surjaatmadja et al. |
| 10,815,988 B2 | 10/2020 | Buckley |
| 10,815,989 B2 | 10/2020 | Naedler et al. |
| 10,830,360 B2 | 11/2020 | Frank |
| 10,851,775 B2 | 12/2020 | Stark |
| 10,865,325 B2 | 12/2020 | Nakao |
| 10,895,325 B2 | 1/2021 | Nowell et al. |
| D910,820 S | 2/2021 | Grassl |
| 10,907,738 B2 | 2/2021 | Nowell |
| 10,914,171 B2 | 2/2021 | Foster |
| 10,934,899 B2 | 3/2021 | Hattiangadi |
| 10,941,765 B2 | 3/2021 | Nowell |
| 10,941,866 B2 | 3/2021 | Nowell |
| 10,954,938 B2 | 3/2021 | Stark |
| 10,961,607 B2 | 3/2021 | Oshima |
| 10,962,001 B2 | 3/2021 | Nowell |
| D916,240 S | 4/2021 | Nowell |
| 10,968,717 B2 | 4/2021 | Tran |
| 10,988,834 B2 | 4/2021 | Lee |
| 10,989,321 B2 | 4/2021 | Hattiangadi |
| 10,995,738 B2 | 5/2021 | Blume |
| 11,009,016 B2 | 5/2021 | Berend |
| 11,028,662 B2 | 6/2021 | Rhodes |
| 11,041,570 B1 | 6/2021 | Buckley |
| 11,073,144 B1 | 7/2021 | Hurst et al. |
| 11,078,903 B2 | 8/2021 | Nowell |
| 11,104,981 B2 | 8/2021 | Chen |
| 11,105,185 B2 | 8/2021 | Spencer |
| 11,105,327 B2 | 8/2021 | Hurst |
| 11,105,328 B2 | 8/2021 | Bryne |
| 11,105,428 B2 | 8/2021 | Warbey |
| 11,111,915 B2 | 9/2021 | Bayyouk |
| 11,131,397 B2 | 9/2021 | Yar |
| D933,104 S | 10/2021 | Ellisor |
| D933,105 S | 10/2021 | Ellisor |
| D933,106 S | 10/2021 | Mullins |
| D933,107 S | 10/2021 | Mullins |
| 11,149,514 B2 | 10/2021 | Witkowski |
| 11,156,221 B2 | 10/2021 | Stark et al. |
| 11,162,859 B2 | 11/2021 | Lei |
| 11,181,101 B2 | 11/2021 | Byrne |
| 11,181,108 B2 | 11/2021 | Brooks |
| 11,225,963 B2 | 1/2022 | Naedler et al. |
| 11,231,111 B2 | 1/2022 | Hurst |
| 11,242,849 B1 | 2/2022 | Smith |
| D949,202 S | 4/2022 | Sharpstone |
| 11,353,117 B1 | 6/2022 | Smith |
| 11,359,615 B2 | 6/2022 | Thomas et al. |
| 11,384,756 B1 | 7/2022 | Smith |
| 11,391,374 B1 | 7/2022 | Ellisor |
| 11,421,679 B1 | 8/2022 | Mullins |
| 11,421,680 B1 | 8/2022 | Smith |
| 11,434,900 B1 | 9/2022 | Alex |
| 11,441,683 B2 | 9/2022 | Mullins et al. |
| 11,454,321 B2 | 9/2022 | Mullins et al. |
| 11,473,686 B2 | 10/2022 | Bayyouk |
| 11,566,713 B2 | 1/2023 | Poremski |
| D980,876 S | 3/2023 | Smith |
| D986,928 S | 5/2023 | Smith et al. |
| D997,992 S | 9/2023 | Smith et al. |
| 11,746,778 B2 | 9/2023 | Bayyouk |
| 11,761,441 B1 | 9/2023 | Alex et al. |
| D1,006,059 S | 11/2023 | Waniek |
| 11,846,356 B1 | 12/2023 | Ellisor |
| 11,891,988 B2 | 2/2024 | Mullins et al. |
| 11,920,684 B1 | 3/2024 | Xu et al. |
| 12,038,086 B2 | 7/2024 | Shuck |
| 12,049,889 B2 | 7/2024 | Ellisor et al. |
| 12,055,221 B2 | 8/2024 | Ellisor et al. |
| 12,140,240 B1 | 11/2024 | Xu |
| D1,061,623 S | 2/2025 | Newberg et al. |
| 2002/0084004 A1 | 7/2002 | Takahashi |
| 2002/0124961 A1 | 9/2002 | Porter |
| 2002/0159914 A1 | 10/2002 | Yeh |
| 2003/0205864 A1 | 11/2003 | Dietle |
| 2003/0233910 A1 | 12/2003 | Jeong |
| 2004/0161351 A1 | 8/2004 | Forrest |
| 2004/0170507 A1 | 9/2004 | Vicars |
| 2004/0194576 A1 | 10/2004 | Ando |
| 2004/0234404 A1 | 11/2004 | Vicars |
| 2004/0255410 A1 | 12/2004 | Schonewille |
| 2004/0258557 A1 | 12/2004 | Shun |
| 2005/0095156 A1 | 5/2005 | Wolters |
| 2005/0200081 A1 | 9/2005 | Stanton |
| 2005/0226754 A1 | 10/2005 | Orr |
| 2006/0002806 A1 | 1/2006 | Baxter |
| 2006/0027779 A1 | 2/2006 | McGuire |
| 2006/0045782 A1 | 3/2006 | Kretzinger |
| 2007/0086910 A1 | 4/2007 | Liang |
| 2007/0154342 A1 | 7/2007 | Tu |
| 2007/0261746 A1 | 11/2007 | Nomichi et al. |
| 2007/0273105 A1 | 11/2007 | Stanton |
| 2007/0295411 A1 | 12/2007 | Schwegman |
| 2008/0031769 A1 | 2/2008 | Yeh |
| 2008/0052014 A1 | 2/2008 | Toyosada |
| 2008/0092384 A1 | 4/2008 | Schaake |
| 2008/0240949 A1 | 10/2008 | Tackett et al. |
| 2008/0279706 A1 | 11/2008 | Gambier |
| 2009/0041611 A1 | 2/2009 | Sathian |
| 2009/0278069 A1 | 11/2009 | Blanco |
| 2009/0261575 A1 | 12/2009 | Bull |
| 2010/0143163 A1 | 6/2010 | Patel et al. |
| 2010/0230628 A1 | 9/2010 | Stefina |
| 2010/0272597 A1 | 12/2010 | Qiao |
| 2011/0079302 A1 | 4/2011 | Hawes |
| 2011/0142701 A1 | 6/2011 | Small |
| 2011/0189040 A1 | 8/2011 | Vicars |
| 2011/0255993 A1 | 10/2011 | Ochoa |
| 2011/0296982 A1 | 12/2011 | Dille et al. |
| 2012/0141308 A1 | 6/2012 | Saini |
| 2012/0163969 A1 | 6/2012 | Ongole |
| 2012/0259593 A1 | 10/2012 | El-Zein |
| 2012/0304821 A1 | 12/2012 | Ando |
| 2013/0020521 A1 | 1/2013 | Byrne |
| 2013/0037739 A1 | 2/2013 | Millard |
| 2013/0202457 A1 | 8/2013 | Bayyouk |
| 2013/0202458 A1 | 8/2013 | Byrne |
| 2013/0263932 A1 | 10/2013 | Baxter et al. |
| 2013/0319220 A1 | 12/2013 | Luharuka |
| 2014/0083541 A1 | 3/2014 | Chandrasekaran |
| 2014/0083547 A1 | 3/2014 | Hwang |
| 2014/0196883 A1 | 7/2014 | Artherholt |
| 2014/0260954 A1 | 9/2014 | Young |
| 2014/0286805 A1 | 9/2014 | Dyer |
| 2014/0322034 A1 | 10/2014 | Bayyouk |
| 2014/0322050 A1 | 10/2014 | Marette et al. |
| 2014/0348677 A1 | 11/2014 | Moeller |
| 2015/0127308 A1 | 5/2015 | Thomas, Jr. et al. |
| 2015/0132157 A1 | 5/2015 | Whaley |
| 2015/0144826 A1 | 5/2015 | Bayyouk |
| 2015/0147194 A1 | 5/2015 | Foote |

(56) References Cited

U.S. PATENT DOCUMENTS

| | | |
|---|---|---|
| 2015/0219096 A1 | 8/2015 | Jain |
| 2015/0300332 A1 | 10/2015 | Kotapish |
| 2015/0368775 A1 | 12/2015 | Baker |
| 2016/0201169 A1 | 7/2016 | Vecchio |
| 2016/0215588 A1 | 7/2016 | Belshan |
| 2016/0238156 A1 | 8/2016 | Hubenschmidt |
| 2016/0245280 A1 | 8/2016 | Todorov |
| 2016/0258433 A1 | 9/2016 | Belshan et al. |
| 2016/0319626 A1 | 11/2016 | Dille |
| 2016/0319805 A1 | 11/2016 | Dille |
| 2016/0327165 A1 | 11/2016 | Sundararajan |
| 2017/0067459 A1 | 3/2017 | Bayyouk |
| 2017/0089334 A1 | 3/2017 | Jahnke |
| 2017/0089470 A1 | 3/2017 | Filipow et al. |
| 2017/0089473 A1 | 3/2017 | Nowell |
| 2017/0097107 A1 | 4/2017 | Hotz |
| 2017/0159655 A1 | 6/2017 | Morreale |
| 2017/0175799 A1 | 6/2017 | Arnold |
| 2017/0204852 A1 | 7/2017 | Barnett, Jr. |
| 2017/0218951 A1 | 8/2017 | Graham |
| 2017/0218993 A1 | 8/2017 | Freed |
| 2017/0297149 A1 | 10/2017 | Shinohara |
| 2017/0298932 A1 | 10/2017 | Wagner |
| 2017/0314097 A1 | 11/2017 | Hong |
| 2017/0342776 A1 | 11/2017 | Bullock |
| 2017/0342976 A1 | 11/2017 | Reddy |
| 2018/0017173 A1 | 1/2018 | Nowell |
| 2018/0058431 A1 | 3/2018 | Blume |
| 2018/0073653 A1 | 3/2018 | Bayyouk |
| 2018/0202434 A1 | 7/2018 | Barnhouse, Jr |
| 2018/0298894 A1 | 10/2018 | Wagner |
| 2018/0312946 A1 | 11/2018 | Gigliotti, Jr. |
| 2018/0320258 A1 | 11/2018 | Stewart |
| 2018/0340245 A1 | 11/2018 | Kernion |
| 2018/0354081 A1 | 12/2018 | Kalyani |
| 2019/0011051 A1 | 1/2019 | Yeung |
| 2019/0017503 A1 | 1/2019 | Foster |
| 2019/0024198 A1 | 1/2019 | Hong |
| 2019/0024225 A1 | 1/2019 | Tang |
| 2019/0032685 A1 | 1/2019 | Foster |
| 2019/0032720 A1 | 1/2019 | Bayyouk |
| 2019/0047049 A1 | 2/2019 | Fujieda |
| 2019/0049052 A1 | 2/2019 | Shuck |
| 2019/0063427 A1 | 2/2019 | Nowell |
| 2019/0071755 A1 | 3/2019 | Lee |
| 2019/0072088 A1 | 3/2019 | DeLeon |
| 2019/0072089 A1 | 3/2019 | Buckley |
| 2019/0085806 A1 | 3/2019 | Meibgeier |
| 2019/0085978 A1 | 3/2019 | Chase |
| 2019/0101109 A1 | 4/2019 | Cortes |
| 2019/0107226 A1 | 4/2019 | Bayyouk |
| 2019/0120389 A1 | 4/2019 | Foster |
| 2019/0136842 A1 | 5/2019 | Nowell |
| 2019/0145400 A1 | 5/2019 | Graham |
| 2019/0145568 A1 | 5/2019 | Nick |
| 2019/0154033 A1 | 5/2019 | Brooks |
| 2019/0170137 A1 | 6/2019 | Chase |
| 2019/0170138 A1 | 6/2019 | Bayyouk |
| 2019/0194786 A1 | 6/2019 | Chuang |
| 2019/0226058 A1 | 7/2019 | Fujieda |
| 2019/0226476 A1 | 7/2019 | Stark et al. |
| 2019/0063430 A1 | 8/2019 | Byrne |
| 2019/0242373 A1 | 8/2019 | Wernig |
| 2019/0247957 A1 | 8/2019 | Stribling |
| 2019/0264683 A1 | 8/2019 | Smith |
| 2019/0292633 A1 | 9/2019 | Porret |
| 2019/0301314 A1 | 10/2019 | Kamo |
| 2019/0301447 A1 | 10/2019 | Skurdalsvold |
| 2019/0316685 A1 | 10/2019 | Wang |
| 2019/0331245 A1 | 10/2019 | Gable et al. |
| 2019/0360483 A1 | 11/2019 | Nowell |
| 2019/0376508 A1 | 12/2019 | Wagner |
| 2020/0056272 A1 | 2/2020 | Hong |
| 2020/0063899 A1 | 2/2020 | Witkowkski |
| 2020/0070034 A1 | 3/2020 | Sukup et al. |
| 2020/0072369 A1 | 3/2020 | Singley et al. |
| 2020/0080660 A1 | 3/2020 | Dyer |
| 2020/0080661 A1 | 3/2020 | Mullins |
| 2020/0157663 A1 | 5/2020 | Yang |
| 2020/0158123 A1 | 5/2020 | Chen |
| 2020/0173317 A1 | 6/2020 | Keating |
| 2020/0023245 A1 | 7/2020 | Blume |
| 2020/0208776 A1 | 7/2020 | Bayyouk |
| 2020/0217424 A1 | 7/2020 | Rasmussen |
| 2020/0232455 A1 | 7/2020 | Blume |
| 2020/0240531 A1 | 7/2020 | Nowell |
| 2020/0256149 A1 | 8/2020 | Witkowski |
| 2020/0284253 A1 | 9/2020 | Foster |
| 2020/0284365 A1 | 9/2020 | Bayyouk |
| 2020/0290118 A1 | 9/2020 | Chen |
| 2020/0291731 A1 | 9/2020 | Haiderer |
| 2020/0300240 A1 | 9/2020 | Nowell |
| 2020/0308683 A1 | 10/2020 | Xue |
| 2020/0347843 A1 | 11/2020 | Mullins |
| 2020/0355182 A1 | 11/2020 | DeLeon |
| 2020/0362970 A1 | 11/2020 | Hurst |
| 2020/0392613 A1 | 12/2020 | Won |
| 2020/0393054 A1 | 12/2020 | Fuller |
| 2020/0399979 A1 | 12/2020 | Webster |
| 2020/0400003 A1 | 12/2020 | Webster |
| 2020/0400130 A1 | 12/2020 | Poehls |
| 2020/0400132 A1 | 12/2020 | Kumar |
| 2020/0400140 A1 | 12/2020 | Bayyouk |
| 2020/0400234 A1 | 12/2020 | Mullins et al. |
| 2020/0400242 A1 | 12/2020 | Spencer |
| 2021/0010113 A1 | 1/2021 | Qiao |
| 2021/0010470 A1 | 1/2021 | Blume |
| 2021/0017830 A1 | 1/2021 | Witkowski |
| 2021/0017982 A1 | 1/2021 | Bayyouk |
| 2021/0017983 A1 | 1/2021 | Myers |
| 2021/0040836 A1 | 2/2021 | Baskin |
| 2021/0054486 A1 | 2/2021 | Kim |
| 2021/0102630 A1 | 4/2021 | Nowell |
| 2021/0108734 A1 | 4/2021 | Nowell |
| 2021/0130936 A1 | 5/2021 | Wu |
| 2021/0146397 A1 | 5/2021 | Mittag et al. |
| 2021/0148471 A1 | 5/2021 | Murugesan |
| 2021/0180156 A1 | 6/2021 | Kim |
| 2021/0190053 A1 | 6/2021 | Wagner |
| 2021/0190223 A1 | 6/2021 | Bayyouk |
| 2021/0197524 A1 | 7/2021 | Maroli |
| 2021/0215071 A1 | 7/2021 | Oikawa |
| 2021/0215154 A1 | 7/2021 | Nowell |
| 2021/0230987 A1 | 7/2021 | Tanner |
| 2021/0239111 A1 | 8/2021 | Zitting |
| 2021/0246537 A1 | 8/2021 | Maroli |
| 2021/0260704 A1 | 8/2021 | Hu |
| 2021/0270261 A1 | 9/2021 | Zhang |
| 2021/0285551 A1 | 9/2021 | Renollett |
| 2021/0310484 A1 | 10/2021 | Myers |
| 2021/0381504 A1 | 12/2021 | Wagner |
| 2021/0381615 A1 | 12/2021 | Riedel |
| 2021/0388832 A1 | 12/2021 | Byrne |
| 2022/0026326 A1 | 1/2022 | Wang |
| 2022/0034402 A1 | 2/2022 | Kiani |
| 2022/0056906 A1 | 2/2022 | Lawson et al. |
| 2022/0065063 A1 | 3/2022 | Xu et al. |
| 2022/0163031 A1 | 5/2022 | Chase |
| 2022/0163032 A1 | 5/2022 | Chase |
| 2022/0243723 A1 | 8/2022 | Herold et al. |
| 2022/0282719 A1 | 9/2022 | Barnhouse |
| 2022/0349472 A1 | 11/2022 | Ellisor |
| 2022/0390055 A1 | 12/2022 | Ellisor |
| 2022/0403839 A1 | 12/2022 | Mullins |
| 2023/0041201 A1 | 2/2023 | Myers et al. |
| 2023/0129538 A1 | 4/2023 | Miller et al. |
| 2023/0130824 A1 | 6/2023 | Belshan et al. |
| 2023/0184241 A1 | 6/2023 | Avey et al. |
| 2023/0220840 A1 | 7/2023 | Avey et al. |
| 2023/0258175 A1 | 8/2023 | Figgs et al. |
| 2023/0279991 A1 | 9/2023 | Avey et al. |
| 2023/0332596 A1 | 10/2023 | Chase |
| 2023/0383743 A1 | 11/2023 | Brock et al. |
| 2023/0383859 A1 | 11/2023 | Wiegand et al. |

(56) References Cited

U.S. PATENT DOCUMENTS

| | | | |
|---|---|---|---|
| 2023/0407864 | A1 | 12/2023 | Alex et al. |
| 2024/0102460 | A1 | 3/2024 | Kachovskiy et al. |
| 2024/0117882 | A1 | 4/2024 | Ellisor |
| 2024/0200656 | A1 | 6/2024 | Avey |
| 2024/0200666 | A1 | 6/2024 | Leake |
| 2024/0369139 | A1 | 11/2024 | Ellisor |
| 2024/0376892 | A1 | 11/2024 | Ellisor |
| 2024/0376984 | A1 | 11/2024 | Ellisor |
| 2024/0418164 | A1 | 12/2024 | Peer |
| 2025/0027486 | A1 | 1/2025 | Alex et al. |
| 2025/0052325 | A1 | 2/2025 | Berryhill |
| 2025/0075818 | A1 | 3/2025 | Xu |

FOREIGN PATENT DOCUMENTS

| | | |
|---|---|---|
| CN | 102748483 | 10/2012 |
| CN | 202545162 U | 11/2012 |
| CN | 203257342 U | 10/2013 |
| CN | 204040978 U | 12/2014 |
| CN | 104329464 A | 2/2015 |
| CN | 204738957 U | 11/2015 |
| CN | 205315253 U | 6/2016 |
| CN | 109458326 A | 3/2019 |
| CN | 209261799 U | 8/2019 |
| CN | 110374522 A | 10/2019 |
| CN | 209469613 U | 10/2019 |
| CN | 111005695 A | 4/2020 |
| CN | 111073186 A | 4/2020 |
| CN | 102410194 | 4/2021 |
| DE | 102009001560 A1 | 9/2010 |
| DE | 202012104058 U1 | 3/2014 |
| EP | 0 414 955 | 3/1991 |
| EP | 0520567 A1 | 12/1992 |
| EP | 3336356 A1 | 6/2018 |
| EP | 3696408 A1 | 8/2020 |
| WO | 2021195572 | 9/2021 |
| WO | 2022167341 A1 | 8/2022 |
| WO | 2024026432 | 2/2024 |
| WO | 2024076786 A1 | 4/2024 |

OTHER PUBLICATIONS

International Search Report and Written Opinion for international application No. PCT/US2023/066143, mailed Aug. 28, 2023.
Karolczuk et al., "Application of the Gaussian Process for Fatigue Life Prediction Under Multiaxial Loading", Mechanical Systems and Signal Processing 167 (2022), Nov. 14, 2021.
Carraro et al. "A Damage Based Model for Crack Initiation in Unidirectional Composites Under Multiaxial Cyclic Loading", Composite Science and Technology 99 (2014), 154-163, May 16, 2014.
Albinmousa et al., "Cyclic Axial and Cyclic Torsional Behaviour of Extruded AZ31B Magnesium Alloy", International Journal of Fatigue 33 (2011), 1403-1416, 2011.
Horstemeyer et al., "Universal Material Constants For Multistage Fatigue (MSF) Modeling of the Process-Structure-Property (PSP) Relations of A000, 2000, 5000, and 7000 Series Aluminum Alloys", Integrating Materials and Manufacturing Innovation, vol. 9 (2020), 157-180, Jun. 22, 2020.
Guan et al., "Model Selection, Updating, and Averaging for Probabilistic Fatigue Damage Prognosis", Journal of Structural Safety, Mar. 11, 2011.
Frick et al., "Orientation-Independent Pseudoelasticity in Small-Scale Niti Compression Pillars", Scripta Materialia 59(12), 7-10, 2008.
Naghipour et al., "Fatigue Analysis of Notched Laminates: A Time-Efficient Macro-Mechanical Approach", Ohio Aerospace Institute, Cleveland, 2016.
Declaration of Duncan Hall from Internet Archive/Wayback Machine, Feb. 3, 2021, Kerr Plunger Pump Manuals, 20 pages.
Michael Agnes, Editor, Webster's New World College Dictionary, Fourth Edition, 1999, 5 pages.
Weir Spm Oil & Gas, Grooveless Fluid End, 2008, 1 page.
Weir Spm Oil & Gas, Weir SPM General Catalog, 2009, 40 pages.
Weir Spm Oil & Gas, Well Service Pump Reference Guide, 2008, 55 pages.
*Intellectual Ventures I LLC v VMWare, Inc.*, Case No. 1:19-CV-01075-ADA, Document 91 (W.D. Tex Jun. 3, 2020), Defendant VMWare, Inc.'s Stipulation of Invalidity Contentions for U.S. Pat. No. 7,949,752, Jun. 3, 2020, 5 pages.
*Vulcan Industrial Holding, LLC et al. v. Kerr Machine Co.* Case No. 4:21-cv-433, Document 1, Complaint for Declaratory Judgment of Patent Non-Infringement, Feb. 9, 2021, 17 pages.
*Trilogy Enterprises, Inc.*, v. *Trilogy Education Services, LLC*, Case. No. 6:19-cv-199-ADA-JCM, Document 35, Fifth Amended Scheduling Order, Sep. 8, 2020, 4 pages.
*Dr. Corneliu Bolbocean v Baylor University*, Case No. 6:19-CV-00465-ADA-JCM, Document 34, Scheduling Order, Apr. 6, 2020, 4 pages.
*Kerr Machine Co., v Vulcan Energy Services, LLC, Vulcan Industrial Holdings, LLC, and Cizion, LLC d/b/a/ Vulcan Industrial Manufacturing*, Case No. 6:21-CV-00044-ADA, Document 4, Plaintiff's Amended Complaint for Patent Infringement and Jury Demand, Jan. 19, 2021, 30 pages.
*Kerr Machine Co., v Vulcan Energy Services, LLC, Vulcan Industrial Holdings, LLC, and Cizion, LLC d/b/a/ Vulcan Industrial Manufacturing*, Case No. 6:21-CV-00044, Document 1, Plaintiff's Original Complaint for Patent Infringement and Jury Demand, Jan. 19, 2021, 47 pages.
*Kerr Machine Co., v Vulcan Energy Services, LLC, Vulcan Industrial Holdings, LLC, and Cizion, LLC d/b/a/ Vulcan Industrial Manufacturing*, Case No. 6:21-CV-00044-ADA, Document 10, Plaintiff's Second Amended Complaint for Patent Infringement and Jury Demand, Feb. 1, 2021, 88 pages.
*Kerr Machine Co., v Vulcan Industrial Holdings, LLC, Vulcan Energy Services, LLC, Cizion, LLC*, Case No. W-20- CV-00200-ADA-24, Order Setting Trial Date, Jun. 14, 2020, 1 page.
*Kerr Machine Co., v Vulcan Industrial Holdings, LLC, Vulcan Energy Services, LLC, Cizion, LLC*, Case No. W-20-CV-00200-ADA-29, Order Setting Trial Date, Aug. 2, 2020, 1 page.
*Kerr Machine Co., v. Vulcan Industrial Holdings, LLC*, Case. No. 6:20-CV-00200-ADA, Affidavit of Service, Apr. 7, 2020, 1 page.
*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Plaintiff's First Amended Complaint for Patent Infringement and Jury Demand, Jun. 4, 2020, 11 pages.
*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Document 26, Defendant Cizion, LLC d/b/a Vulcan Industrial Manufacturing, LLC's Motion to Dismiss or Transfer, Jul. 22, 2020, 10 pages.
*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Defendants' Opposed Motion to Stay Litigation Pending the Outcome of the Pending Post-Grant Review Proceeding Before the Patent Trial and Appeal Board, Jul. 31, 2020, 14 pages.
*Kerr Machine Co., v Vulcan Industrial Holdings, LLC*, Case No. 6:20-CV-00200-ADA, Plaintiff's Preliminary Infringement Contentions, May 22, 2020, 50 pages.
*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Defendants' Preliminary Invalidity Contentions, Aug. 13, 2020, 29 pages.
*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Document 34, Scheduling Order, Aug. 11, 2020, 3 pages.
*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Document 38, Plaintiff's Second Amended Complaint for Patent Infringement and Jury Demand, Sep. 25, 2020, 11 pages.

(56) References Cited

OTHER PUBLICATIONS

*Kerr Machine Co.,* v *Vulcan Industrial Holdings, LLC, Vulcan Energy Services, LLC, and Cizion, LLC d/b/a/ Vulcan Industrial Manufacturing,* Case No. 6:20-CV-00200-ADA, Document 5, Standing Order regarding Scheduled Hearings In Civil Cases in Light of Chief Judge Garcia's 24 Amended Order, Mar. 24, 2020, 4 pages.
*Kerr Machine Co.,* v *Vulcan Industrial Holdings, LLC, Vulcan Energy Services, LLC, and Cizion, LLC d/b/a/ Vulcan Industrial Manufacturing,* Civil Docket for Case No. 6:20-cv-00200-ADA, accessed Sep. 11, 2020, 7 pages.
*Kerr Machine Co.,* v *Vulcan Industrial Holdings, LLC, Vulcan Energy Services, LLC, and Cizion, LLC d/b/a/ Vulcan Industrial Manufacturing,* Case No. 6:20-CV-00200-ADA, Document 54, Claim Construction Order, Dec. 3, 2020, 3 pages.
*Kerr Machine Co.,* v *Vulcan Industrial Holdings, LLC, Vulcan Energy Services, LLC, and Cizion, LLC d/b/a/ Vulcan Industrial Manufacturing,* Case No. 6:20-CV-00200-ADA, Docket Entry, Aug. 2, 2020, 1 page.
*Kerr Machine Co.,* v *Vulcan Industrial Holdings, LLC,* Case No. 6:20-CV-00200, Document 1, Plaintiff's Original Complaint for Patent Infringement and Jury Demand, Mar. 19, 2020, 39 pages.
*Adriana del Rocio Barberena-Rovira, et al.,* v *Kuiper Dairy, LLC, et al.,* Case No. 6:20-CV-00250-ADA-JCM, Document 20, Scheduling Order, Jul. 22, 2020, 4 pages.
*Acquanlan Deonshay Harris* v. *Cenlar, FSB,* Case No. 6:20-CV-00271-ADA-JCM, Document 13, Scheduling Order, Aug. 20, 2020, 4 pages.
Senior Living Properties, LLC c. Ironshore Speciality, Insurance Company, Case No. 6:20-CV-00282-ADA-JCM, Document 12, Scheduling Order, Jul. 7, 2020, 4 pages.
*Dionne Bracken,* Individually and as Next Friend of A.M.B., v *Michael D. Ashcraft and Envirovac Waste Transport Systems, Inc.,* Case No. 6:20-CV-00308-ADA-JCM, Document 17, Scheduling Order, Jul. 28, 2020, 4 pages.
*Kendra Coufal* v. *Roger Lee Thomas and Apple Logistics, Inc.,* Case No. 6:20-CV-00356-ADA-JCM, Document 12, Scheduling Order, Jul. 28, 2020, 4 pages.
*Tipton International, Inc.,* v. *Vetbizcorp, LLC and Samuel Cody,* Case No. 6:20-CV-00554-ADA-JCM, Document 8, Scheduling Order, Aug. 20, 2020, 4 pages.
*Dynaenergetics GmbH & Co. KG and Dynaenergetics US, Inc.,* v. *Hunting Titan, Ltd.; Hunting Titan, Inc.; and Hunting Energy Services, Inc.,* Case No. H-17-3784, Order, Sep. 4, 2020, 2 pages.
Slip Opinion, In re Sand Revolution LLC, Case No. 2020-00145 (Fed. Cir. Sep. 28, 2020), 3 pages.
In re Vulcan Industrial Holdings, LLC, Case No. 2020-00151 (Fed. Cir. Sep. 29, 2020), Petition for Writ of Mandamus, 43 pages.
*Densys Ltd.,* v. *3Shape Trios A/S and 3Shape A/S,* Case No. WA:19-CV-00680-ADA, Document 27, Scheduling Order, Apr. 8, 2020, 4 pages.
*Kerr Machine Co.* vs. *Vulcan Industrial Holdings, LLC,* Case No. WA:20-CV-00200-ADA, Order Setting Markman Hearing, May 29, 2020, 1 page.
Sur-Lock Liner Retention System—Product Brochure (p. 16) (Year: 2017).
Sur-Lock Liner Retention System—Video (https://premiumoilfield.com/performance-enhancements/sur-lock/sur-lock-liner-retention-system.html) (https://www.youtube.com/watch?v=6NZGeD5NkF8) (Year: 2017).
U.S. Appl. No. 17/241,680 titled "Fluid End and Center Feed Suction Manifold" filed Apr. 27, 2021.
Flowserve, "Dynamic Balance Plug Valve and Double DB Plug Valve: Installation, Operation and Maintenance," 2011, https://www.flowserve.com/sites/default/files/2016-07/NVENIM2005-00_0.pdf, 36 pages.
Weir Oil & Gas, "SPM Well Service Pumps & Flow Control Products TWS600S Fluid End Operation Instruction and Service Manual," Feb. 27, 2017, https://www.global.weir/assets/files/oil%20and%20gas%20ebrochures/manuals/tws600s-fluid-end-2p121260.pdf, 41 pages.
White Star Pump Co., "Maintenance Manual: Triplex Pump WS-1300/1600," 2005, http://www.whitestarpump.com/ES/docs/user_t.pdf, 45 pages.
KerrPumps, "Super Stainless Steel Better Than The Best," http://kerrpumps.com/superstainless?gclid=EAlalQobChMlg470482q6wlVilTICh2XPA-qEAAYASAAEgKrxPD_BwE, 2013, last accessed: Aug. 21, 2020, 6 pages.
KerrPumps, "Frac One Pumps—Fluid End—Fracing," http://kerrpumps.com/fracone, 2013, last accessed: Aug. 21, 2020, 3 pages.
KerrPumps, "KerrPumps—Frac Pump & Mud Pump Fluid End—Fluid End Pump," http://kerrpumps.com/fluidends, 2013, last accessed: Aug. 21, 2020, 6 pages.
Vulcan Industrial, "Vulcan," http://www.vulcanindustrial.com/, 2019, last accessed: Aug. 21, 2020, 3 pages.
Vulcan Industrial, "Vulcan," http://www.vulcanindustrial.com/fluid-ends/, 2019, last accessed: Aug. 21, 2020, 3 pages.
Covert Manufacturing, Inc., "Fluid End Block: Covert Manufacturing", (site visited Jul. 30, 2021), covertmfg.com, URL: <http://www.covertmfg.com/our-capabilities/fluid-end-block/> (Year: 2021).
Kerr Pumps, "the most advanced fluid ends", (site visited Aug. 5, 2021), Kerrpumps.com, URL: <http://kerrpumps.com/fluidends> (Year: 2021).
Shandong Baorun, 2250 Triplex Plunger Pump Fluid End Exchangeable with Spm, (site visited Aug. 5, 2021), made-in-china.com, URL: <https://sdbaorun.en.made-in-china.com/product/wNixIDXYrshL/China-2250-Triplex-Plunger-Pump-Fluid-End-Exchangeable-with-Spm.html> (Year: 2021).
John Miller, "The Reciprocating Pump, Theory, Design and Use," 1995, 2nd Edition, Krieger Publishing Company, Malabar, Florida, 1 page.
"QIH-1000 Hp Quintuplex," Dixie Iron Works, 2017, https://web.archive.org/web/20171031221150/http:/www.diwmsi.com/pumping/qi-1000/.
Technical Manual MSI Hybrid Well Service Pump Triplex and Quintuplex Models, Dixie Iron Works, Mar. 12, 2019, 88 pages. https://www.diwmsi.com/pumping/qi-1000/.
Carpenter, "CarTech Ferrium C61 Data Sheet," 2015, 2 pages.
The American Heritage Dictionary, Second College Edition, 1982, 6 pages.
Matthew Bultman, "Judge in West Texas Patent Hot Spot Issues Revised Guidelines," Sep. 23, 2020, Bloomberg Law News, 3 pages.
David L. Taylor, "Machine Trades Blueprint Reading: Second Edition," 2005, 3 pages.
Blume, U.S. Pat. No. 6,544,012, issued Apr. 8, 2003, Fig. 12A.
Caterpillar, "Cat Fluid Ends For Well Stimulation Pumps," 2015, 2 pages.
Claim Chart for U.S. Pat. No. 6,544,012, 23 pages.
Claim Chart for U.S. Pat. No. 7, 186,097, 22 pages.
Claim Chart for U.S. Pat. No. 7,845,413, 8 pages.
Claim Chart for U.S. Pat. No. 9,534,472, 8 pages.
Claim Chart for U.S. Pat. Pub. No. 2013/0319220, 17 pages.
Claim Chart for U.S. Pat. Pub. No. 2014/0348677, 10 pages.
Claim Chart for U.S. Pat. Pub. No. 2015/0132157, 23 pages.
Claim Chart for "GD-3000," 9 pages.
Claim Chart for "NOV-267Q," 14 pages.
Collins English Dictionary, "annular," https://www.collinsdictionary.com/us/dictionary/english/annular, 2021, 4 pages.
Collins English Dictionary, "circumference," https://www.collinsdictionary.com/us/dictionary/english/circumference, 2021, 7 pages.
Collins English Dictionary, "plug," https://www.collinsdictionary.com/us/dictionary/english/plug, 2021, 17 pages.
Collins English Dictionary, "profile," https://www.collinsdictionary.com/us/dictionary/english/profile, 2021, 10 pages.
Collins English Dictionary, "sleeve," "therethrough," "through," "tube," and "tubular," 8 pages.
Collins English Dictionary, "space," https://www.collinsdictionary.com/us/dictionary/english/space, 2021, 13 pages.
Collins English Dictionary, "stairstep," https://www.collinsdictionary.com/us/dictionary/english/stairstep, 2021, 3 pages.

(56) References Cited

OTHER PUBLICATIONS

Congressional Record—Extensions of Remarks, Apr. 18, 2007, pp. E773-E775.
Congressional Record, Mar. 7, 2011, 31 pages.
"Declaration of Steven M. Tipton, Ph.D., P.E., Submitted with Patent Owner's Preliminary Response," Sep. 11, 2020, 155 pages.
"Declaration of William D. Marscher, P.E.—U.S. Pat. No. 10,914,171," Feb. 11, 2021, 308 pages.
"Declaration of William D. Marscher, P.E.—U.S. Pat. No. 10,591,070," May 25, 2020, 209 pages.
Email dated Sep. 22, 2020 in PGR2020-00065, 3 pages.
Email dated Sep. 25, 2020 in *Kerr Machine* v *Vulcan Industrial Holdings*, 1 page.
U.S. Appl. No. 16/722,139.
U.S. Appl. No. 13/773,271.
U.S. Appl. No. 15/719,124.
U.S. Appl. No. 16/814,267.
U.S. Appn. No. 17/120,121.
U.S. Appl. No. 62/234,483.
U.S. Appl. No. 62/315,343.
U.S. Appl. No. 62/318,542.
U.S. Appl. No. 62/346,915.
U.S. Appl. No. 62/379,462.
"Flush Free Sealing Benefits," Oct. 3, 2011, http://empoweringpumps.com/flush-free-sealing-benefits/, accessed May 9, 2020, 5 pages.
Gardner Denver, Well Servicing Pump Model GD-3000—Operating and Service Manual, Apr. 2011, 44 pages.
Gardner Denver, Well Servicing Pump Model GD-1000Q—Fluid End Parts List, Sep. 2011, 24 pages.
Gardner Denver, Well Servicing Pump Model HD-2250—Operating and Service Manual, Jan. 2005, 44 pages.
Gardner Denver, GD 2500Q HDF Frac & Well Service Pump, 2 pages.
Cutting Tool Engineering, "Groove milling," Aug. 1, 2012, https://www.ctemag.cojm/news/articles/groove-milling, accessed May 13, 2020, 11 pages.
Vargususa, "Groovex Innovative Grooving Solutions—Groove Milling, " Dec. 12, 2011, http://www.youtube.com/watch?v=vrFxHJUXjvk, 68 pages.
Kerr Pumps, Kerr KA-3500B/KA-3500BCB Plunger Pump Parts and Service Manual, 41 pages.
Kerr Pumps, Kerr KD-1250B/KD-1250BCB Plunger Pump Service Manual, 38 pages.
Kerr Pumps, Kerr KJ-2250B and KJ-2250BCB Plunger Pump Service Manual, 38 pages.
Kerr Pumps, Kerr KM-3250B / KM-3250BCB Plunger Pump Service Manual, 35 pages.
Kerr Pumps, Kerr KP-3300B / KP-3300BCB Plunger Pump Service Manual, 41 pages.
Kerr Pumps, Kerr KT-3350B/BCB KT-3400BCB Plunger Pump Service Manual, 46 pages.
Kerr Pumps, Kerr triplex pump km3250bcb 10,000 psi @ 5.1 gmp, Feb. 2, 2021, http://imged.com/kerr-triplex-pump-km3250bcb-10-000-psi-5-1-gmp-8234739.html, 2 pages.
Lex Machina, 77 Federal district court cases for Alan D Albright of W.D. Tex., http://law.lexmachina.com/court/txwd/judge/5198506/cases?status=open&filed_on-from=2020-02-19&filed_on-to=2020-04-19&pending-, 7 pages.
Lex Machina, Motion Metrics Report for 834 orders issued by District Judge Alan D Albright (ADA) in 1,603 cases from the Search for federal district court cases before Judge Alan D Albright, https://law.lexmachina.com/motions/motion_metrics?cases_key=yyix9Y8-k2k, generated on Sep. 23, 2020, 1 page.
Lex Machina, 6:20-cv-00200-ADA, *Kerr Machine Co.* v. *Vulcan Industrial Holdings, LLC* Docket Entries, https://law.lexmachina.com/cases/2004206451#docket-entries, 6 pages.
Jonathan Maes, "Machining Square Inside Corners: Conquer the Nightmare!," accessed Sep. 8, 2020, https://makeitfrommetal.com/machining-square-inside-corners-the-night .., 22 pages.
Ross Mackay, "Process Engineering: Properly seal that pump," May 17, 2005, https://www.chemicalprocessing.com/articles/2005/465, 11 pages.
MSI Fluid End Components, https://www.scribd.com/document/421304589/Fluid-End, 1 page.
MSI Dixie Iron Works, Ltd., MSI QI-1000 Technical Manual for 1000 HP Quintuplex MSI QI-1000 Pump, Feb. 21, 2004, 90 pages.
MSI, Product Listing and Pricing, accessed Mar. 8, 2016, 19 pages.
National Oilwell Varco, 267Q-6M Quinuplex Plunger Pump: Parts List, Jul. 21, 2008, 13 pages.
Oil and Gas Well Servicing, Audit Procedures for Oil and Gas Well Servicing, May 2010, Texas Comptroller of Public Accounts, Audit Division, 68 pages.
Tony Atkins and Marcel Escudier, Oxford Dictionary of Mechanical Engineering, Oxford University Press, 2013, 10 pages.
Parker Hannifin Corporation and Autoclave Engineers, Technical Information, 2016, 16 pages.
Girdhar, Moniz and Mackay, "Chapter 5.4 Centrifugal pump design," Plant and Process Engineering 360, 2010, pp. 519-536.
Parker Hannifin Corporation, PolyPak Seals for Hydraulic Applications Catalog EPS 5370_PolyPak, 2015, 38 pages.
Paresh Girdhar and Octo Moniz, "Practical Centrifugal Pumps—Design. Operation and Maintenance," Newnes, 2005, 33 pages.
Reinhard Preiss, "Stress concentration factors of flat end to cylindrical shell connection with a fillet or stress relief groove subjected to internal pressure," 1997, Int. J. Pres. Ves. & Piping, vol. 73, pp. 183-190.
Caterpillar, WS255 Quintuplex Well Stimulation Pump, 2 pages.
Gardner Denver Pumps, Redline Series Brochure, 3 pages.
Eaton Aerospace Group, Resilient Metallic Seals, TF100-35D, Oct. 2013, 60 pages.
Scott McKeown, "District Court Trial Dates Tend to Slip After PTAB Discretionary Denials—Patents Post-Grant," Jul. 24, 2020, Ropes & Gray, accessed Sep. 23, 2020, 3 pages.
Ricky Smith and R. Keith Mobley, "Rules of Thumb for Maintenance and Reliability Engineers—Chapter 14: Packing and Seals," Elsevier, 2008, pp. 239-250.
Schlumberger, Jet Manual 02—Reciprocating Pumps, Aug. 7, 2015, 63 pages.
Schlumberger, Treating Equipment Manual: Fluid Ends, Section 10, Apr. 2000, 87 pages.
SPM Oil & Gas, Spm Qem 3000 Frac Pump, 2021, 4 pages.
Supplemental Declaration of Steven M. Tipton, Ph.D., P.E.—Case PGR2020-00065, U.S. Pat. No. 10,591,070, Mar. 2, 2021, 35 pages.
Servagroup, TPD 600 Triplex Pump Brochure, Mar. 24, 2011, 2 pages.
Jtex Industries, Inc., Well Service Products Catalog, Jun. 2017, 51 pages.
Utex Industries, Inc., Well Service Packing—Packing Assemblies Complete & Replacement, May 2013, 40 pages.
Vargus Ltd., Groove Milling High Precision Tools for Groove Milling, Dec. 2012, pp. 2-22.
Vulcan, High-Impact Replacement Parts, Fortified Valves and Seats, found at: https://www.vulcanindustrial.com/energy-products/replacement-parts.

Radial Distribution

Circumferential Distribution

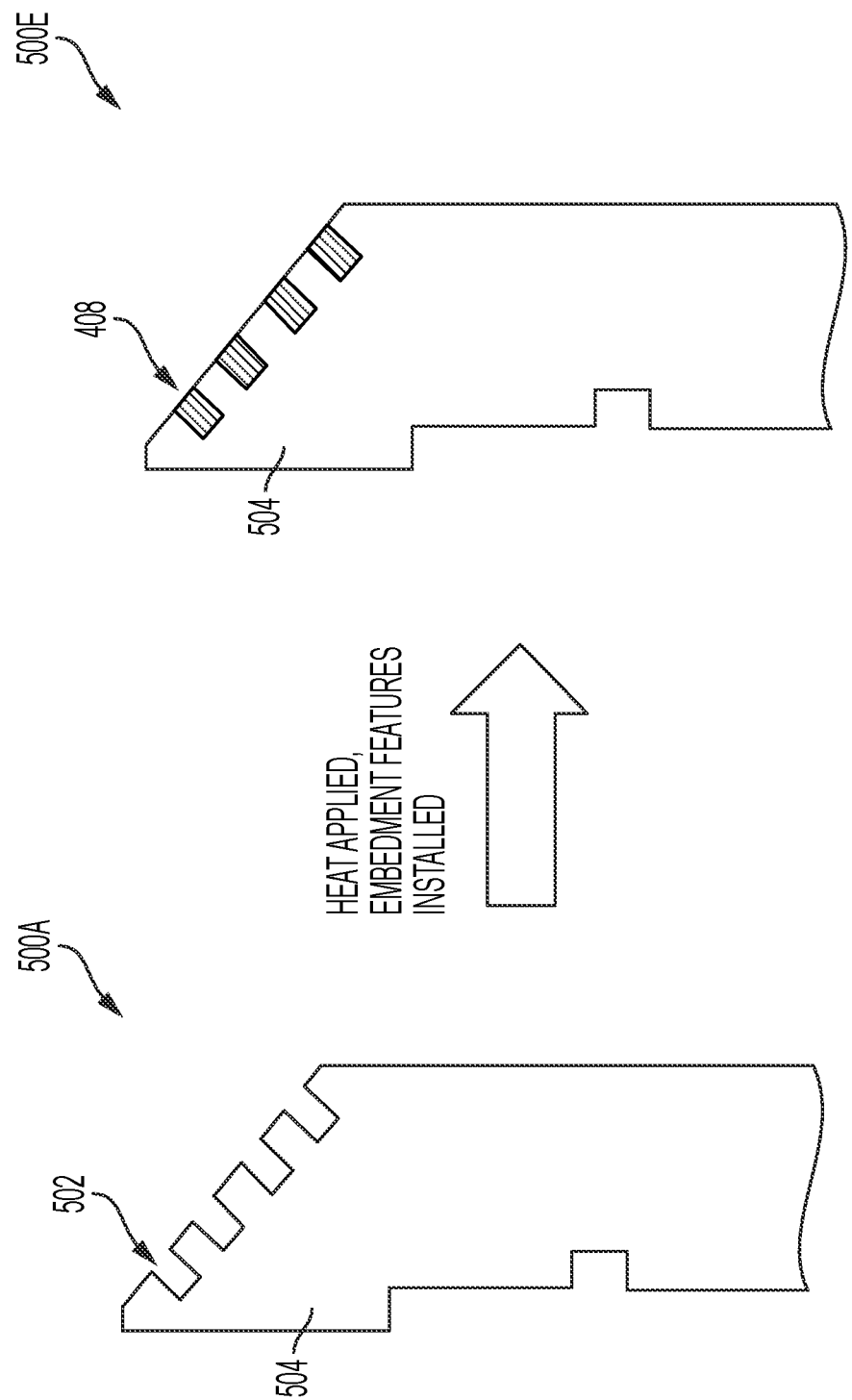

VALVE SEAT WITH EMBEDDED STRUCTURE AND RELATED METHODS

PRIORITY CLAIM

This application claims the benefit of and priority to U.S. Provisional Patent Application No. 63/316,766, filed Mar. 4, 2022, and titled "Valve with a Discontinuous Material Surface Structure," the contents of which are incorporated herein by reference in their entirety.

TECHNICAL FIELD

This disclosure generally relates to pump systems, and in particular to valve seats used in pump systems and related methods.

BACKGROUND

Pumping systems may be used in a variety of applications, such as industrial applications where pumping systems are used to elevate a working fluid pressure. One such application is hydraulic fracturing systems, where high pressure pumps are used to increase a fluid pressure of a working fluid (such as fracturing fluid, slurry, etc.) for injection into an underground formation. The working fluid may include particulates, which are injected into fissures of the formation. When the fluid is removed from the formation, the particulates remain and "prop" open the fissures, facilitating flow of oil and gas or other formation fluids. In many applications, reciprocating pumps are used where a fluid is introduced into a fluid end inlet passage and emitted through an outlet passage. A plunger reciprocates within a bore to add energy to the fluid. Due to the particulates and corrosive nature of the working fluid, sealing surfaces may become eroded or otherwise damaged.

SUMMARY

Applicant recognized the problems noted above herein and conceived and developed embodiments of systems and methods, according to the present disclosure, for valve seats with improved resistance to wear, cracking, or damage, and in various embodiments, fluid ends containing one or more valve seats. For instance, in some embodiments, a valve seat may have a strike face defined (at least partially) by an embedded structure having a gradient material structure that has a continuous compositional change from a first material along the strike face to a second material so as to avoid a sharp mismatch of thermal and/or mechanical properties therein.

Some embodiments disclosed herein are directed to a valve seat for a pumping assembly. In some embodiments, the valve seat includes a body having a bore. In addition, the valve seat includes an embedded structure embedded in the body to define, at least partially, a strike face of the valve seat. The strike face extends circumferentially about the bore. The embedded structure including a gradient material structure having a first material, a second material spaced from the first material, and a compositional transition region between the first material and the second material.

Some embodiments disclosed herein are directed to a valve seat strike face. In some embodiments, the valve seat strike face includes a first portion having a base material of a body of the valve seat. In addition, the valve seat strike face includes a second portion having an embedded structure embedded into the body and that includes a gradient material structure having a first material, a second material spaced from the first material, and a compositional transition region between the first material and the second material.

Some embodiments disclosed herein are directed to a method of forming a strike face of a body of a valve seat for a pumping system. In some embodiments, the method includes inserting a plurality of embedded features into a plurality of recesses in the body. Each embedded feature includes a gradient material structure having a first material, a second material spaced from the first material, and a compositional transition region between the first material and the second material. In addition, the method includes securing the plurality of embedded features within the plurality of recesses such that the plurality of embedded features at least partially define the strike face.

In some embodiments, the method includes arranging a plurality of embedded features in a pattern. Each embedded feature includes a gradient material structure having a first material, a second material spaced from the first material, and a compositional transition region between the first material and the second material. In addition, the method includes filling, at least partially, gaps between the embedded features with a metallic powder. Further, the method includes sintering the metallic powder and the embedded features to form a metallurgically bonded structure including the embedded features and the metallic powder. Still further, the method includes bonding the metallurgically bonded structure to a valve seat such that the metallurgically bonded structure defines a strike face of the valve seat.

In accordance with one or more embodiments, a valve seat for a pumping assembly includes a top portion having a bore extending therethrough. The top portion has a strike face, and at least a portion of the strike face is formed from an embedded structure. The embedded structure covers a range of between 5% and 95% of a surface area of the strike face.

In accordance with another embodiment, a valve seat strike face includes a first portion formed from a first material and a second portion formed from a second material discontinuously embedded into the first material.

Embodiments described herein include a combination of features and characteristics intended to address various shortcomings associated with certain prior devices, systems, and methods. The foregoing has outlined rather broadly the features and technical characteristics of the some of the disclosed embodiments in order that the detailed description that follows may be better understood. The various characteristics and features described above, as well as others, will be readily apparent to those having ordinary skill in the art upon reading the following detailed description, and by referring to the accompanying drawings. It should be appreciated that this disclosure may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

This disclosure will be better understood on reading the following detailed description of non-limiting embodiments thereof, and on examining the accompanying drawings, in which:

FIGS. 5A-5E are cross-sectional side views of embodiments of valve seats including an embedded structure, in accordance with embodiments of the present disclosure.

DETAILED DESCRIPTION

Figure 1A:
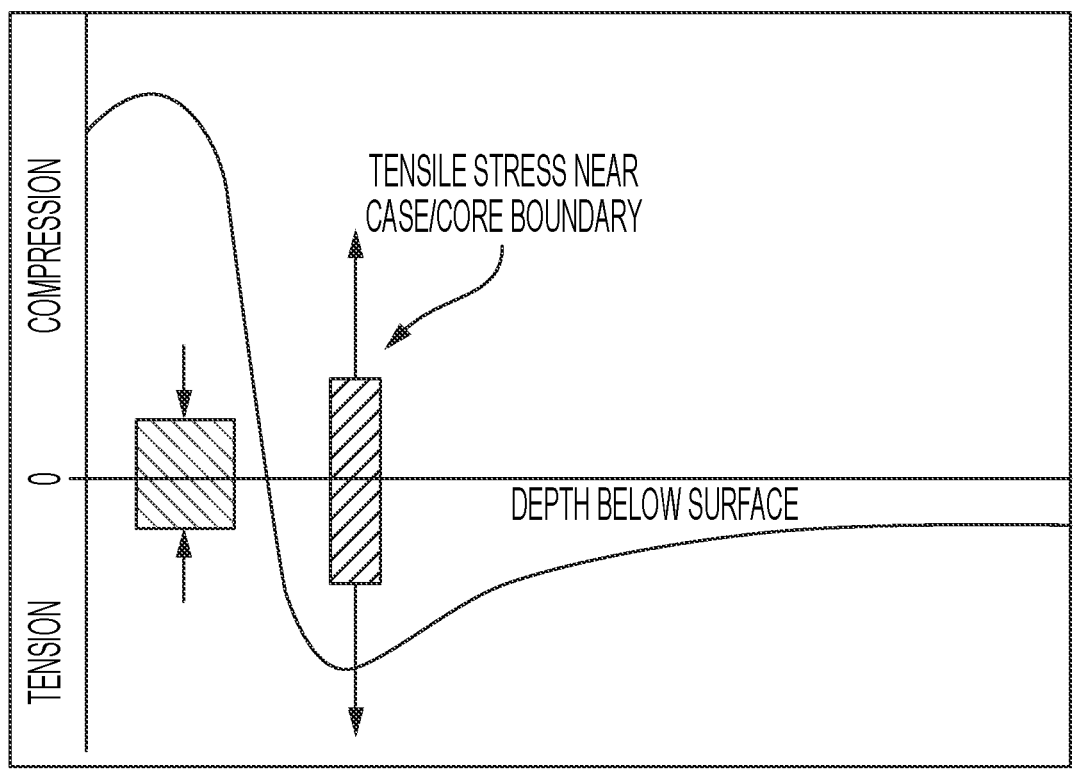
FIG. 1A is a graphical representation of an example of residual stress of case hardened steel.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Additionally, like reference numerals may be used for like components, but such use is for convenience purposes and not intended to limit the scope of the present disclosure. Moreover, use of terms such as substantially or approximately, when used in relation to a specified value, may refer to +/−10 percent of the specified value. In addition, as used herein, the terms "axial" and "axially" generally mean along or parallel to a given axis (such as a central axis of a body), while the terms "radial" and "radially" generally mean perpendicular to the given axis. For instance, an axial distance refers to a distance measured along or parallel to the axis, and a radial distance means a distance measured perpendicular to the axis.

Embodiments of the present disclosure are directed toward tools or parts that may be subject to dynamic loading along with abrasive and/or corrosive mediums. It should be appreciated that while various embodiments may be described with reference to pumps, such as hydraulic fracturing pumps, that such description is for illustrative purposes only and not intended to limit the scope of the present disclosure. By way of example, systems and methods may be utilized with equipment such as frac pumps, mud pumps, wastewater pumps, sand blenders and mixers, earth moving and mining equipment, harvester blades, wind energy turbine blades, and the like. Accordingly, various systems and methods may be incorporated into the formation or repair of various components, such as valves/valve seats, plungers, mixer blades, and the like.

One or more embodiments of the present disclosure are directed toward valve seats having discontinuous material arrangements that define at least a portion of a strike face for the valve seat. In some embodiments, these material arrangements are embedded into the valve seat and may be referred to as discontinuous embedded structure (or more simply an "embedded structure"), where at least a portion of the embedded structure forms or defines at least a portion of the strike face of the valve seat. Various embodiments include the embedded structure, and the embedded structure may include material having a different composition than a base material of the valve seat. For example, as will be understood by those skilled in the art, the embedded structure may be inserted or otherwise incorporated into the base material. The embedded structure may be incorporated into the base material by use of one or more manufacturing techniques including, but not limited to, sintering (such as hot isostatic pressure sintering, solid sintering, liquid phase sintering, semi-liquid phase sintering, etc.), brazing, press fitting, and the like.

In some embodiments, an embedded structure may cover and define from about 5% to about 95% of a surface areas of the strike face of the valve seat. The embedded structure, or one or more embedded features making up one or more portions of the embedded structure, may be radially or circumferentially distributed relative to a central or longitudinal axis of the valve seat, and/or may be distributed isometrically or non-isometrically along the strike face. As used herein, an "isometric distribution" may refer to a uniform or equal spacing of the embedded features of the embedded structure along the strike face, and a "non-isometric distribution" may refer to a non-uniform or unequal spacing of at least some of the embedded features of the embedded structure along the strike face. The geometry of the embedded structure and/or the embedded features may be round, square, elliptic, rectangle, trapezoidal, hexagonal, and others. In some embodiments having a non-isometric distribution, a spacing (e.g., in one or more directions) of embedded features may be less on a radially inner area of the strike face (relative to a central or longitudinal axis of the valve seat) such that the embedded structure may have a higher density or concentration of embedded features on the radially inner area of the strike face.

In some embodiments, the embedded structure may have different material properties than a base material of the valve seat. In some embodiments, one or more of the embedded features making up the embedded structure may include an engineering material class with a Vickers hardness (HV) greater than 850. Examples of the materials of some embodiments of the embedded features of the embedded structure may include, but are not limited to, carbides-compounds composed of carbide and less electronegative elements, such as tungsten carbide, silicon carbide, boron carbide, titanium carbide, vanadium carbide, etc.; ceramics-alumina ($Al_2O_3$), Nitrides ($Si_3N_4$), Sialons ($Si_2AlON_3$), Zirconia ($ZrO_2$); high or medium entropy alloys or ceramics —FeMnCoCrC, AlCoCrFeNiTi, TiAlNiCoFe, VNbMoTaW, NiCrCoTiV, TiZrNbWMo, NiCrCoTiV, NbMoTaWVTi, NbMoTiCrVTa, MoNbTaW, HfNbTaTiZrN; intermetallic compounds-chemical compounds composed of two or more metallic or semi-metallic elements arranged in an ordered structure, such as $Ni_3Al$, $Ti_3Al$; composites-steel matrix reinforced by hard carbides, ceramic, oxides, nitrides, intermetallic compounds, zirconia or high entropy materials; super hard tool steels and composites—W—Co—V-Ch-Fe (Carpenter Maxamet, M48, M4, M62), high Vanadium carbide tool steel (CPM 15V), etc. or some combination thereof. It should be appreciated that different embedded features of the embedded structure may be formed from different materials and that various embodiments may mix two or more materials. A size of the embedded structure may be from 0.05" to 2", or more specifically 0.10" to 1.0". It should be appreciated that the sizes may refer to the embedded structure as a whole or to one or more embedded features forming or defining the embedded structure.

In some embodiments, the embedded features of the embedded structure may include materials having a gradient material structure with continuous composition changes of high entropy alloy (HEA), high entropy ceramic (HEC), medium entropy alloy (MEA), medium entropy ceramic (MEC), a cermet, or combinations thereof, from an outer surface to a substrate core, as opposed to using two segments of two different materials. In some embodiments, such materials may be referred to as "resistant materials" due to their resistance to abrasion or cracking. Accordingly, when the embedded structure utilizes resistant materials, mechanical and thermal properties smoothly transit and match from the outer surface into the substrate core to prevent thermal or fatigue cracking that occurs commonly in the traditional hard coating, overlay, or carbide inserts. In at least some embodiments, a gradient composite structure with continuous composition changes and smooth property transitions from the outer surface to the core are utilized to form one or more portions of industrial components. In some embodiments, the gradient composite structure is a metal matrix composite with maximum hard reinforcement weight percent (wt %) on an outer or exterior surface and gradual reduction of the hard reinforcement wt % to a core composition positioned inwardly from the outer surface (or a core composition positioned at an interior location of the gradient composite structure), and a smooth thermal and mechanical property transition region from the outer surface to the core composition of the interior location.

Valves and valve seats are important mating parts/tools of a fracture pump system that suctions and discharges high pressure fracture fluid (that may have a pressure greater than the strength of the rock formation, which may be up to approximately 15,000 psi) into gas and oil well to fracture the tight rock formations for oil production. The suction and discharge movement of the fracturing fluid loaded with hard proppant (such as sands or ceramic particles) through the pump puts the valves and valve seats under constant pulsing hydraulic pressure (such as cyclic hydraulic pressure from approximately 100 psi to approximately 15,000 psi in some embodiments) and severe abrasive plowing and wear. The fracturing fluids often are corrosive, which may further accelerate the failures of the valves and valve seats. The short lifetime of these consumable parts forces the fracture fleets to routinely shut down the frac pumps and replace the consumables parts, leading to high non-productive time (NPT) and maintenance cost. Conventionally, these challenges have been addressed by use of a ductile low carbon steel core combined with a carburized or case-hardened surface layer on a valve seat. However, while these techniques may enjoy some amount of success when pumping less corrosive fluids (such as fresh water) at lower hydraulic pressure (<10,000 psi) and with a lower volume of proppant, Applicant has recognized that these techniques are ineffective when pumping corrosive fluids having high pressure and high proppant load such that these conventional techniques often cannot meet operational demands.

Additional conventional techniques for addressing the above-noted challenges associated with operating a pump in the severe conditions of hydraulic fracturing include forming a valve seat from a ductile medium carbon steel core and inserting hard carbides (such as tungsten carbide (WC) and cobalt (Co)) into the seal faces. While the hard carbide inserts increase abrasive resistance of the seat seal faces and extend seat lifetime to some degree, Applicant has recognized that brittle shattering or surface fatigue cracking of the hard surface, along with carbide insert de-bonding from the seat body, occurs, which causes severe erosion and washing out of the associated equipment, such as fluid ends. The root causes attributing to or sources of the problems have been recognized by Applicant and are believed to be that the hard carbides or case-hardened layers are intrinsically brittle with very low fracture toughness, in the range less than 15 MPa $(m)^{1/2}$. This low fracture toughness, combined with the sharp mismatch of thermal or mechanical properties, such as thermal expansion coefficient and Young's modulus (or elastic modulus), between the hard-facing layers and steel core, may lead to the failures seen in the industry. Applicant has recognized these problems, identified the causes or sources of the problems, and now finds that the industry is in need for better material and design innovations for the next generation valve seats. Applicant has further recognized that such problems may also occur in various other industries facing similar severe operating conditions.

Embodiments of the present disclosure are directed toward hard, strong, yet ductile, gradient material structures (GMS), associated gradient compositions, mechanically and thermally gradient microstructures and properties, and one or more processes for making the GMS. Embodiments may be further directed toward uses for a valve seat and/or new valve seat design features introduced by the gradient material structures, such as incorporation of the GMS into one or more embedded structures (or portions thereof) forming part or all of a valve seat strike face. Applicant further notes that such materials, and embedded structures, may also be incorporated into other tool parts under abrasive, corrosive, and dynamic loading conditions.

In some embodiments, the GMS material structure may include an HEA, HEC, MEA, MEC, cermet, or combinations thereof. As used herein, HEA may be formed by mixing equally or relatively large proportions of usually five or more elements from the group of the refractory elements including, but not limited to, tungsten, vanadium, niobium, molybdenum, tantalum, or transition metal elements iron, cobalt, manganese, chromium, nickel. As used herein, HEC may include a multicomponent of ceramic oxides, carbide, nitrides, silicides, and borides. The HEAs and HECs have superior hardness and toughness combination with fracture toughness equal to or greater than about 60-200 MPa $(m)^{1/2}$ and Vickers hardness that is greater than or equal to (=>) 800 HV, such as from about 800 HV to about 1400 HV. In contrast, conventional hard carbides, oxides, or ceramics coatings have fracture toughness in the low range of less than 2-12 MPa (m)$^{1/2}$ and are prone to brittle shattering and cracking.

As will be described herein, embodiments of the present disclosure are directed toward one or more components, such as valve seats, that include at least an HEA structure forming one or more portions of an embedded structure with a ductile steel core. In some embodiments, the HEA structure has a gradient composition from 100% hard HEA alloys (e.g., HV>800), inwardly to 75%, 50%, 25%, and to 100% of steel core. Unlike the traditional hard coatings that have thermal expansion and elastic modulus mismatches to the substrate core material, the gradient HEA structure shows a smooth thermal and mechanical transition of material properties from the valve seat surface to the core, leading to a thermal residual stress and crack free and high adhesion bonding material.

In some embodiments, a comparison of the coefficient of thermal expansion (CTE) and the elastic modulus (or Young's Modulus) of a gradient material structure according to some embodiments of the disclosure and a traditional WC coating on a steel substrate demonstrates that HEA hard-facing according to some embodiments of the disclosure has a smooth transition of CTE of 8.84×10$^{-6}$/° C. on the outer surface to 12×10$^{-6}$/° C. in the substrate core compared with sharp increase of CTE at the interface (for example, at around 2 mm in depth) from 2×10$^{-6}$/° C. to 13×10$^{-6}$/° C. at the substrate core. A similar relationship can be seen for the elastic modulus. CTE and elastic modulus are just two examples of thermal and mechanical properties compared herein. It should be appreciated that there are many other thermal and mechanical properties that show the same smoothness and sharpness of the transitions for the two surface techniques. Applicant has identified that such sharp changes or mismatches in material thermal and mechanical properties of the traditional hard coatings are root causes, and potentially the main root causes, of surface brittleness and cracking of the hard-facing or coating materials under abrasive and dynamic loadings.

Various embodiments may also provide a gradient structure that has a composite structure including a steel matrix with reinforcements. The steel matrix may include, but is not limited to, carbon steel, high strength low alloy steel, tool steel, bearing steel, stainless steel, and combinations thereof. The reinforcements may include, but are not limited to, ceramics (such as carbides, nitrides, oxides, etc.), cermets, and intermetallic compounds in different forms (such as powders, fibers (short or continuous), nanoparticles, or tubes, etc.).

In some embodiments, one or more composite structures include a gradient composition having mechanical and thermal properties with maximum hard reinforcement weight percent (wt %) on an outer surface with a gradual reduction to a core composition inwardly from the outer surface. The composition may further include a smooth thermal and mechanical property transition from the outer surface to the core composition.

In some embodiments, one or more methods to process the gradient HEA, MEA, HEC, and/or MEC GMS include thermal spraying, vapor deposition, powder metallurgy, brazing, hot isostatic pressing, pressure die forging, additive manufacturing (such as three dimensional (3D) printing), laser surface alloying or cladding, and welding. In at least one embodiment, due to the energy sources used to melt and spray the hard-facing powders or wires, the thermal spray processes may be further divided into flame power/wire, high velocity oxyfuel (HVOF), detonation gun, and plasma spray. Various embodiments may include a thermal spray process to manufacture the HEA, MEA, HEC, and/or MEC GMS. The method may employ a dual feeder system and scheduled feeding profile to feed the proper amount of HEA, MEA, HEC, and/or MEC powers and steel core powder into the heating/melting chamber. The mixture of the two powders in fine liquid droplets is carried by the processing gas at a high travel speed in the range of 800 m/s and impacts on substrate surface to form a bonded hard-facing. By controlling the movement of the spray gun relative to the stationary substrate target surface, different coating thickness and surface area profiles can be achieved.

In some embodiments, the GMS is used to form or define one or more portions of an embedded structure, such as for instance one or more of the embedded features that make up the embedded structure. The embedded structure can then be installed within or bonded to a metal valve seat or other tools by traditional joining techniques such as welding, brazing, sintering, and the like. The steel base of the embedded structure (including the GMS forming or defining the embedded features of the embedded structure) may be the same metal material as the metal valve seat, which makes the joining to the metal valve seat easier with a strong joint.

Various embodiments of the present disclosure may address or overcome common problems associated with existing techniques. By way of example, abrasive wear and fatigue cracking in valve seals are traditionally addressed using methods such as 1) carburized and case-hardened valve seats, 2) carbide insert valve seats, 3) thermal sprayed hard-facing valve seats, among others. All of these techniques, however, share at least one common problem, namely, the weak bonding interface at or near the boundary of the hard surface layer (such as the hardened case, the insert, or the hard-facing) and steel core. This weak bonding interface may be caused by the residual stresses at the case/core boundary due to a sharp mismatch of the thermal and mechanical properties of the hard surface layer and soft steel core. For example, as shown in the graphical representation of FIG. 1A, a tensile residual stress near case/core boundary of a carburized and case-hardened steel valve seat is developed due to thermal and mechanical mismatch between the hardened case and core. This tensile residual stress significantly decreases the impact fatigue resistance and stress corrosion cracking resistance of the valve seats. Embodiments of the present disclosure address the industry need for new material and processing technologies that are able to greatly decrease or completely eliminate the thermal and mechanical mismatches and, therefore, the residual tensile stresses at the surface hardened layer and the core.

Figure 1B:
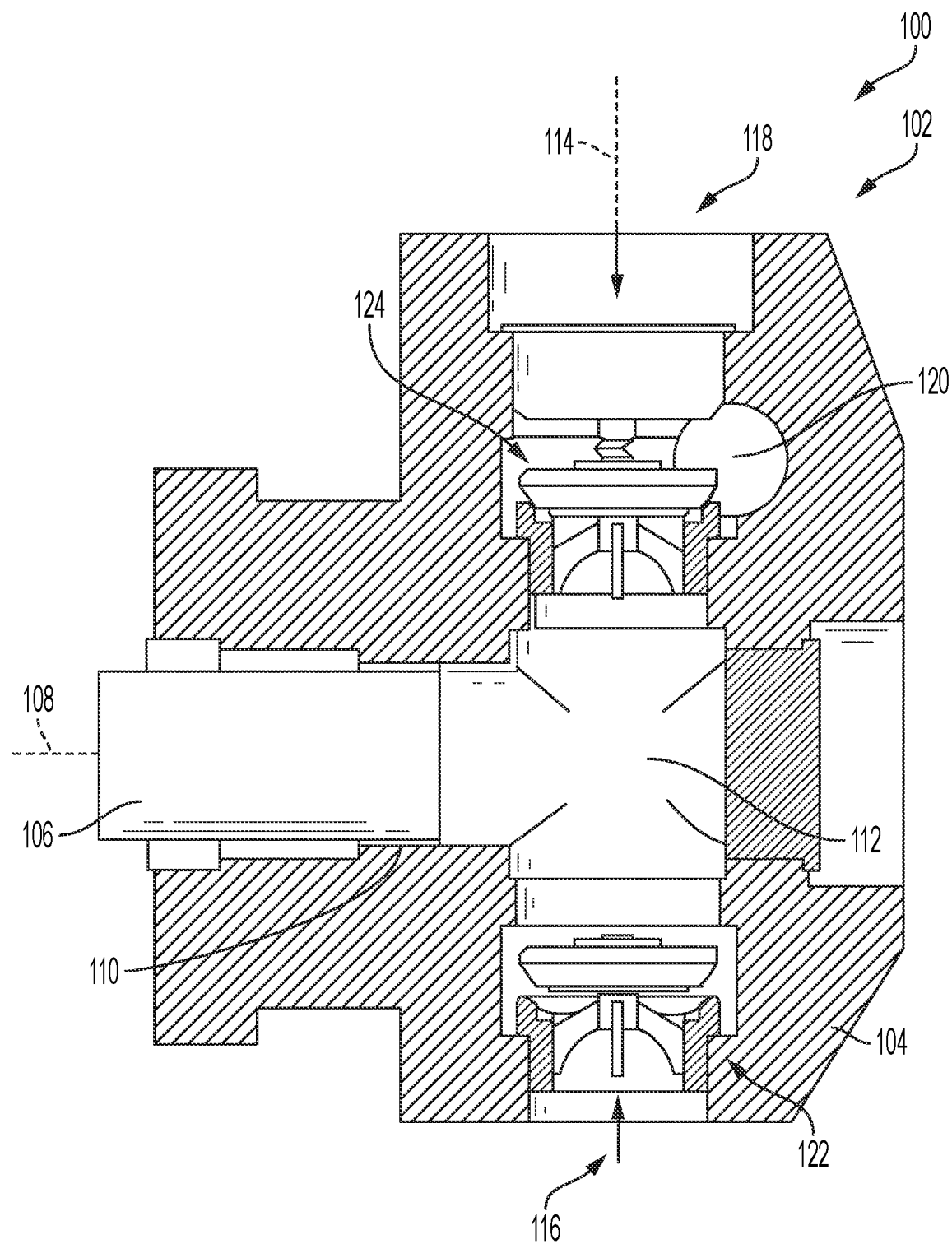
FIG. 1B is a schematic cross-sectional view of an embodiment of a pump assembly, in accordance with embodiments of the present disclosure.

FIG. 1B is a schematic cross-sectional view of an embodiment of a pump assembly 100, which may also be referred to as a reciprocating pump assembly and/or a reciprocating pump. The pump assembly 100 may be utilized during hydraulic fracturing operations, among other operations, where a working fluid (such as fracturing fluid, slurry, etc.) is introduced into the pump and energy is added to the working fluid to increase a pressure of the working fluid. Fracturing fluid, by way of example only, may include corrosives and particulates, such as sand or ceramics, which are utilized during fracturing operations. These corrosives and particulates cause erosion within the pump assembly 100, which may undesirably affect fracturing operations and lead to down times to replace various components. Additionally, the fracturing fluids may include corrosive acids and the like, which may wear down components of the pump assembly 100.

It should be appreciated that various components of the pump assembly 100 have been removed for clarity with the following discussion. For example, a power end has been removed in favor of focusing on the illustrated fluid end 102 of the pump assembly 100. The power end (not shown) may include a crankshaft that is driven by an engine or motor to facilitate operations. The fluid end 102 includes a fluid end block 104 that may house one or more components discussed herein. A plunger rod 106 is driven (such as via the crankshaft) to reciprocate within the fluid end block 104 along a plunger axis 108. The plunger rod 106 is positioned within a bore 110 extending through at least a portion of the fluid end block 104. The illustrated bore 110 is arranged along the plunger axis 108 (a "first axis") and intersects a pressure chamber 112, which is arranged along a pressure chamber axis 114 (a "second axis"), which is positioned substantially perpendicular to the plunger axis 108. It should be appreciated that the pump assembly 100 may include multiple plunger rod and pressure chamber arrangements, which may be referred to as a plunger throw. For example, the pump assembly 100 may be a triplex pump, quadplex pump, quintuplex pump, and the like.

The illustrated fluid end block 104 includes an inlet passage 116 and an outlet passage 118, which are generally coaxial and arranged along the pressure chamber axis 114. In other words, the inlet passage 116 and the outlet chamber 118 are axially aligned with respect to one another and/or the pressure chamber 112 along the pressure chamber axis 114. In some embodiments, fluid enters the pressure chamber 112 via the inlet passage 116, for example during an up stroke (or suction stroke) of the plunger rod 106, and the fluid is driven out of the pressure chamber 112 to an outlet passage 120, for example during a down stroke (or discharge stroke) of the plunger 106.

Respective valve assemblies 122, 124 are arranged within the inlet passage 116 and the outlet chamber 118. These valve assemblies 122, 124 are spring loaded in the illustrated embodiment, but it should be appreciated that such an arrangement is for illustrative purposes only. In operation, a differential pressure may drive movement of the valve assemblies. For example, during the up stroke of the plunger rod 106, pressure at the inlet passage 116 may overcome the spring force of the valve assembly 122, thereby driving fluid into the pressure chamber 112 via the inlet passage 116. However, during the down stroke of the plunger rod 106, the valve assembly 122 may be driven to a closed position, while the spring force of the valve assembly 124 is overcome, thereby driving the fluid out of the pressure chamber 112 and into the outlet passage 120 via the outlet chamber 118.

In some embodiments, damage along valve seats associated with the valve assemblies 122, 124 may lead to leaks, which may reduce pumping efficiencies and lead to costly shut-downs and repair operations. For example, working fluid associated with the pump assembly 100 may include solid particles, which may interact with a valve member as the valve member contacts the valve seat, thereby leading to scarring or other defects. Furthermore, corrosive materials may also wear out materials over time. Various embodiments of the present disclosure may include one or more valve seats having an embedded structure including one or more embedded features having a GMS with a continuous composition change of one or more of an HEA, HEC, MEA, MEC, or combinations thereof proximate the strike face with a different substrate core. Accordingly, the strike face or surface locations most prone to damage or exposure to damaging material may be formed from materials more suitable for such conditions, while the structure of the material enables a smooth transition of material and thermal properties from the surface to the core. In at least one embodiment, a GMS includes continuous composition changes and smooth property transitions or transition regions from the surface to the core. As previously described, the GMS may form or be incorporated within an embedded structure (as one or more embedded features) that is embedded within the valve seat to form or define (at least partially) the strike face.

Figure 2:
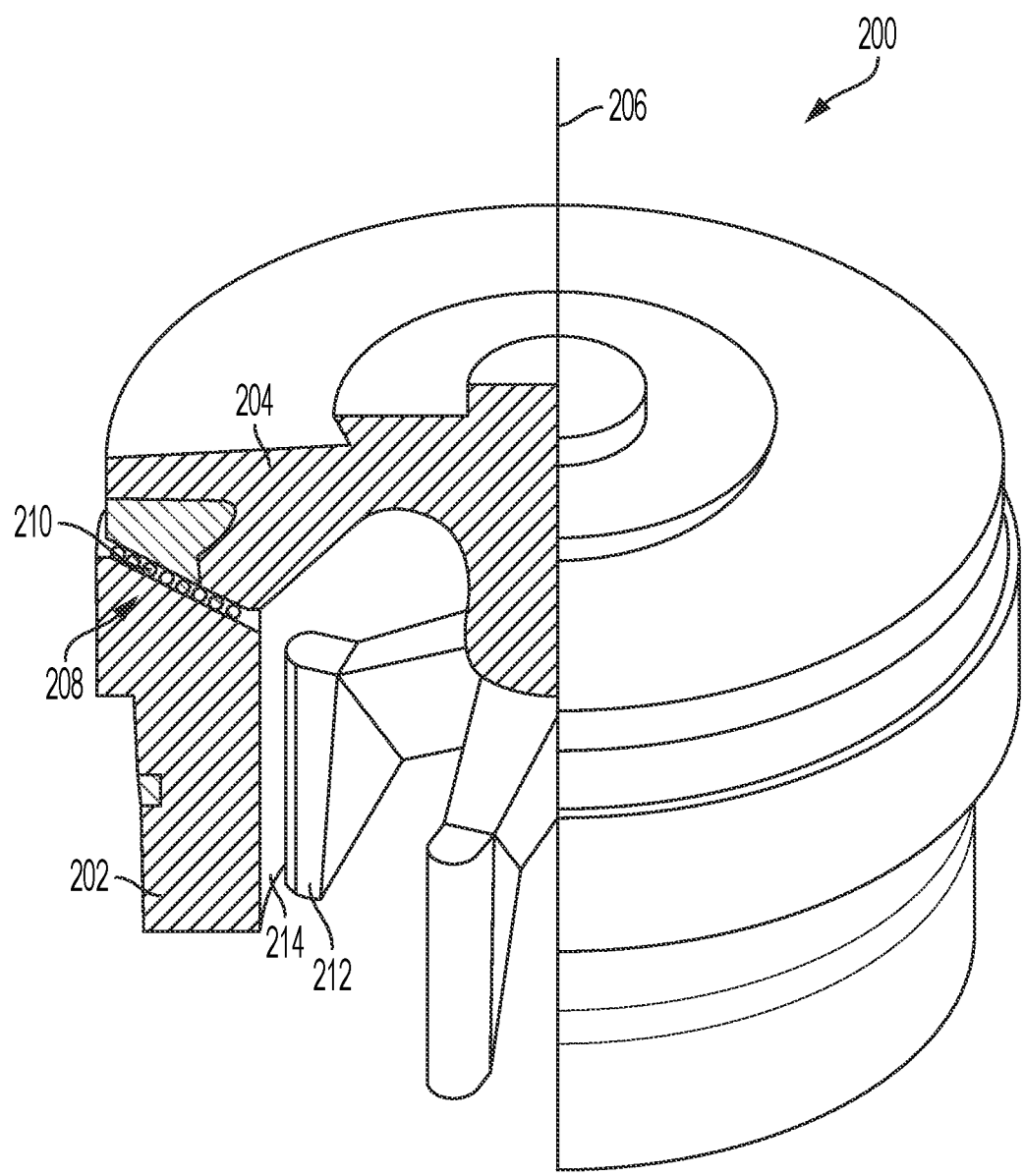
FIG. 2 is a cut-away perspective view of an embodiment of a valve assembly, in accordance with embodiments of the present disclosure.

FIG. 2 is a schematic cut away view a valve assembly 200, which may be utilized as one or more of the valve assemblies 122, 124 of pump assembly 100 shown in FIG. 1B according to some embodiments. The illustrated valve assembly 200 includes a valve seat 202 and a valve member 204. It should be appreciated that the valve seat 202 may refer to the structure of the valve seat 202 and may include multiple constituent components, such as a body, a strike face, and the like. In operation, the valve member 204 reciprocates along a valve axis 206, which may be aligned with the pressure chamber axis 114, such that the valve member 204 moves into and out of contact with at least a portion of the valve seat 202. In the illustrated embodiment, particulates 210 have accumulated along the valve seat 202, for example at a strike face 208 (e.g., contact face). Repeated contact from the valve member 204 may drive the particulates 210 into the strike face 208, causing scarring or other damage. Additionally, corrosive fluids may contact other portions of the valve seat 202, in addition to the strike face 208. Damage to the valve seat 202 may cause the sealing capability of the valve assembly 200 to degrade, thereby reducing the effectiveness of the pump assembly 100 (FIG. 1B) as previously described.

In various embodiments, guide legs 212 of the valve member 204 may also cause damage to various portions of the valve seat 202. For example, in the illustrated embodiment, the guide legs 212 extend into a bore 214 of the valve seat 202. The bore 214 may be coaxially aligned with and extend along the valve axis 206. Due to the presence of the corrosive fluid and/or the particulates, damage may occur along the bore 214, such as scarring. As a result, the pump assembly may be taken out of service for repairs, which may be expensive and contribute to non-productive time at the well site. Accordingly, embodiments of the present disclosure are directed toward systems and methods for forming improved valve seats, which may be part of valve assemblies.

Figures 3A, 3B:
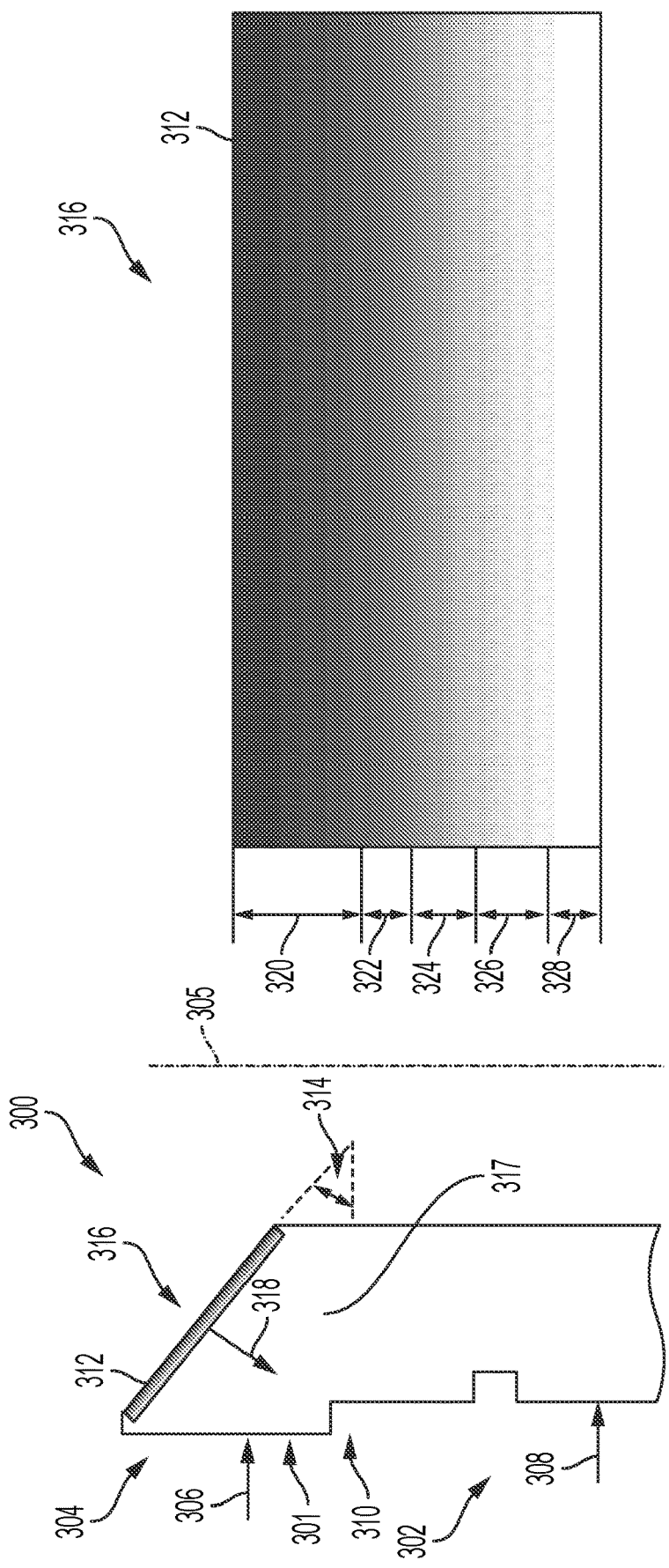
FIG. 3A is a cross-sectional view of an embodiment of a valve seat having a gradient material structure, in accordance with embodiments of the present disclosure.
FIG. 3B is a cross-sectional view of an embodiment of a gradient material structure, in accordance with embodiments of the present disclosure.

FIG. 3A is a partial cross-sectional view of an embodiment of a valve seat 300, which may be utilized as the valve seat 202 shown in FIG. 2 according to one or more embodiments of the present disclosure. In this example, the valve seat 300 includes a body 301 having a lower portion 302 and an upper portion 304. The upper portion 304 may be referred to herein as a "first portion" of the body 301 and the lower portion 302 may be referred to herein as a "second portion" of the body 301. A bore 315 extends through both the upper portion 304 and the lower portion 302 of the body 301 along a central or longitudinal axis 305 of the valve seat 300. The illustrated upper portion 304 has a larger outer diameter 306 than an outer diameter 308 of the lower portion 302, thereby forming or defining a shelf (or shoulder) 310 that may be used to support the valve seat 300 within a bore, such as within a bore of a pump. It should be appreciated that this illustrated configuration is for illustrative purposes only and that, in other embodiments, the respective outer diameters 306, 308 may be the same size or the outer diameter 308 may be larger than the outer diameter 306.

The upper portion 304 includes a strike face 312 arranged at a non-zero angle 314 relative to a radius of the central axis 305. In some embodiments, the angle 314 may be greater than 0° and less than 90°. It should be appreciated that the angle 314 may be particularly selected based, at least in part, on one or more operating conditions or mating components, such as a valve member. Furthermore, it should be appreciated that the angle 314 may not be constant along the strike face 312 and that more than one angle may be present to form a stepped strike face 312 and/or stepped portions that form at least a portion of the strike face 312. In this example, at least a portion of the valve seat 300 includes a gradient material structure (GMS) 316, which is schematically illustrated as defining at least a portion of the strike face 312 and extending into the upper portion 304.

In this example, the GMS 316 has a gradient composition that is approximately 100% HEA, MEA, HEC, MEC, or some combination thereof at or near the surface (strike face 312) and then gradually reduces toward a core 317, as illustrated by the arrow 318. In some embodiments, the arrow 318 may extend into the GMS 316 from the strike face 312 along a direction that is aligned with a normal (or perpendicular) direction relative to the outer surface of the strike face 312. For example, the GMS 316 may be approximately 100% HEA, MEA, HEC, MEC, or some combination thereof at or near the surface and then reduce to approximately 75%, 50%, 25% and then 0% along the path of the arrow 318. In some embodiments, the GMS 316 may have a thickness (for example, a thickness along the direction of arrow 318) that may range from about 0.05 millimeters (mm) to about 10 mm, or from about 0.1 mm to about 5 mm, or from about 0.1 mm to about 2 mm. As noted above, such a transition may avoid the problems experienced by traditional hard coatings that have thermal expansion and elastic modulus mismatches with the substrate core material. In contrast, the illustrated structure shows a smooth thermal and mechanical transition of material properties from the valve seat surface (strike face 312) to the core (or an internal portion of the valve seat 300). To that end, embodiments of the present disclosure provide reduced thermal residual tensile stress and increased impact cracking or stress corrosion cracking resistance while still maintaining high adhesion between materials.

FIG. 3B is a detailed cross-sectional view of an embodiment of the GMS 316 to illustrate the change between different percentages of HEA, MEA, HEC, MEC, or some combination thereof. In this example, the darker regions are representative of higher percentages of HEA, MEA, HEC, MEC, or some combination thereof when compared to the lighter regions. The percentages or concentrations of materials in these regions decrease respectively, in this example, in the different layers or regions as illustrated. For example: a first region (or layer) 320 is approximately 100% HEA, MEA, HEC, MEC, or some combination thereof; a second region (or layer) 322 is approximately 75% HEA, MEA, HEC, MEC, or some combination thereof; a third region (or layer) 324 is approximately 50% HEA, MEA, HEC, MEC, or some combination thereof; a fourth region (or layer) 326 is approximately 25% HEA, MEA, HEC, MEC, or some combination thereof; and a fifth region (or layer) 328 illustrates the steel substrate of the valve seat 300. Thus, the regions 322, 324, 326 may be referred to collectively as a "compositional transition region" (or more simply "region") in which the composition of the GMS 316 transitions from HEA, MEA, HEC, MEC, or some combination thereof to the steel substrate of the valve seat 300. These percentages are provided by way of example only and are not intended to limit the scope of the present disclosure. Moreover, there may be more or fewer regions. In some embodiments, the percentage of HEA, MEA, HEC, MEC, or some combination thereof may change continuously through each of the regions 320, 322, 324, 326, 328, and the example percentages of HEA, MEA, HEC, MEC, or some combination thereof may represent maximum or average values of HEA, MEA, HEC, MEC, or some combination thereof within the regions 320, 322, 325, 326, 328. In some embodiments, the percentage of HEA, MEA, HEC, MEC, or some combination thereof may undergo step changes between the regions 320, 322, 324, 326, 328, and the example percentage of HEA, MEA, HEC, MEC, or some combination thereof provided above may be maintained (or substantially maintained) throughout each of the regions 320, 322, 324, 326, 328.

It should be appreciated that respective widths or thicknesses of the different regions may be particularly selected based, at least in part, on one or more design conditions. As a result, the regions 320, 322, 324, 326, 328 may not have the same thickness, the regions 320, 322, 324, 326, 328 may have the same thickness, some regions 320, 322, 324, 326, 328 may have the same thickness while others do not, and other such combinations.

FIGS. 4A-4E are top plan views of embodiments of strike faces 400A-400E of valve seats illustrating various discontinuous material surface structures that may include one or more embedded structures 402 that are embedded within the body (body 301 shown in FIG. 3) of the valve seat and that form or define at least a portion of the strike face 400 (strike faces 400A-400E in FIGS. 4A-4E, respectively). Specifically, the strike face 400 (strike faces 400A-400E in FIGS. 4A-4E, respectively) may have a portion defined by the embedded structure and a remaining portion that may be defined by a base material of the body of the valve seat.

The embedded structures 402 of the strike faces 400A-400E of FIGS. 4A-4E include embedded features 408 that each include a GMS as described herein (and that are embedded in the body of the valve seat as previously described). Thus, each of the embedded features 408 described herein for FIGS. 400A-400E may include the regions 320, 322, 324, 326, 328 previously described above for the GMS 316 of valve seat 300 shown in FIGS. 3A and 3B.

The strike faces 400A-400E shown in FIGS. 4A-4E may represent the strike face 208 on valve seat 200 shown in FIG. 2 according to some embodiments. Thus, the strike faces 400 may include annular structures that extend circumferentially or annularly about a bore 403 and axis 405 which correspond to the bore 214 and axis 206, respectively, of the valve seat 200 shown in FIG. 2 according to some embodiments. FIGS. 4A-4E show half (e.g., about 180° about axis 405) of each of the strike faces 400A-400E so as to simplify the drawings; however, it should be appreciated that the strike faces 400A-400E may extend a full 360° about the axis 405.

In some embodiments, the strike faces 400A-400E define at least a portion of a valve seat and may be arranged at an angle or slope (such as the angle 314 shown in FIG. 3A), where an outer diameter 404 has a downward slope toward an inner diameter 406. In some embodiments, there may be one or more plateaus or flats along one or more regions of the slope, such as a flat at the outer diameter 404. It should be appreciated that embodiments of the present disclosure may be incorporated into strike faces 400A-400E with a variety of different shapes and geometries and that the examples herein are provided to be illustrative.

Figure 4A:
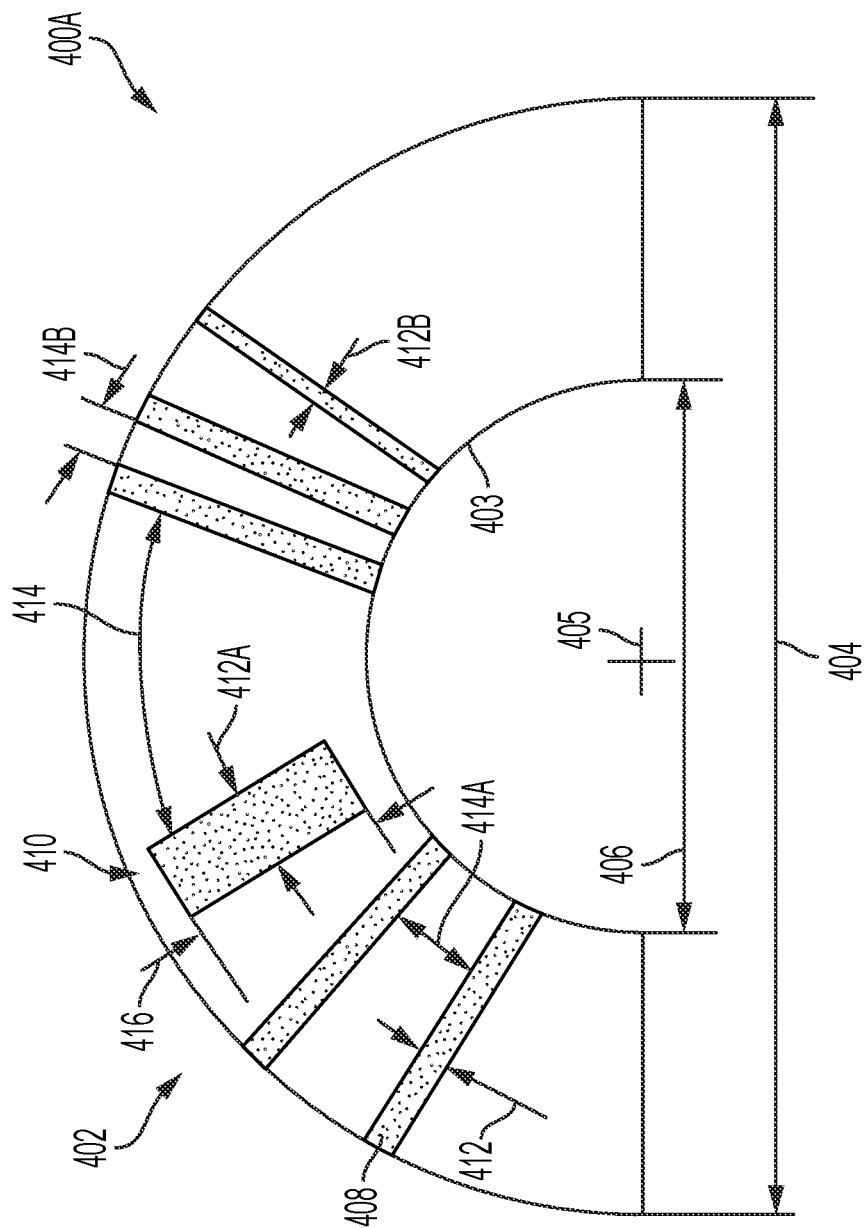
FIGS. 4A-4F are top plan views of embodiments of strike faces of a valve seat including an embedded structure, in accordance with embodiments of the present disclosure.

FIG. 4A is a top plan view of an embodiment of a strike face 400A including an embedded structure 402 (for example a discontinuous embedded structure) that includes a number of embedded features 408 (such as a plurality of embedded features 408 or one or more embedded features 408). As noted above, the individual components (such as individual embedded features 408) may individually be called embedded structures or entire groupings of individual components (such as groupings of embedded features 408) may be called embedded structures (such as embedded structure 402). In this example, the embedded structure 402 illustrates a set of circumferentially distributed embedded features 408 that include elongated features extending in a radial direction relative to the central axis 405 between the inner diameter 406 to the outer diameter 404. In some embodiments, the individual embedded features 408 (or at least one of the embedded features 408) are continuous (or extend continuously) from the inner diameter 406 to the outer diameter 404, but it should be appreciated that such may not be the case in all embodiments, as will be illustrated herein. Furthermore, in various embodiments, the embedded features 408 may not extend from the inner diameter 406 to the outer diameter 404 and there may be one or more gaps or spaces 410 positioned radially between the radial ends of one or more of the embedded features 408 and the inner diameter 406 and/or the outer diameter 404. Thus, in some embodiments, the radial ends of one or more of the embedded features 408 may be radially spaced from the inner diameter 406 and/or outer diameter 404 relative to central axis 405. In some embodiments, the gaps 410 are positioned radially between the corresponding embedded feature 408 and the inner diameter 406. In some embodiments, the gaps 410 are positioned radially between the corresponding embedded feature 408 and the outer diameter 404. In some embodiments, the gaps 410 are positioned radially between the corresponding embedded feature 408 and the inner diameter 406 and positioned radially between the corresponding embedded feature 408 and the outer diameter 404.

The embedded features 408 include a width 412. In this example, width 412 refers to a circumferential span of the embedded features 408 relative to and about the central axis 405. Thus, the width 412 may be referred to herein as a "circumferential width" 412. The width 412 may vary between different embedded features 408 or even along one embedded feature 408. For instance, as shown in FIG. 4A, a first width 412A of a one embedded feature 408 may be larger than a second width 412B of another embedded feature 408. It should be appreciated that the widths 412 (including the first width 412A and second width 412B) may vary based on anticipated operating conditions, design factors, and the like. For example, a set of embedded features 408 may have the first width 412A while a second set has the second width 412B. Additionally, in some embodiments, embedded features 408 with different widths 412 may alternate around at least a portion of the circumference of the strike face 400.

The illustrated embodiment of FIG. 4A shows the embedded features 408 circumferentially spaced from one another by a spacing 414 that extends circumferentially between circumferentially adjacent embedded features 408. Thus, the spacing 414 may include an arc extending circumferentially relative to axis 405 between circumferentially adjacent embedded features 408. Because the embedded features 408 extend radially with respect to the central axis 405, the spacing 414 between circumferentially adjacent embedded features may generally decrease when moving radially toward the inner diameter 406.

The spacing 414 may vary between different areas of the strike face 400, as noted above with respect to the width 412. For example, a first spacing 414A (or a first average spacing 414A) circumferentially between a first pair of circumferentially adjacent embedded features 408 is larger than a second spacing 414B (or a second average spacing 414B) circumferentially between a second pair of circumferentially adjacent embedded features 408. Accordingly, different regions of the strike face 400A may be particularly selected to receive a greater number or concentration of embedded features 408 compared to other regions of the strike face 400A by adjusting (among other things) the spacing 414 and/or the width 412.

As noted above, the embedded features 408 may cover or define between 5% and 95% of a total surface area of the strike face 400A. Accordingly, various embodiments of the present disclosure may include selection of features such as the widths 412 and/or the spacings 414 to accommodate such a design consideration to obtain the desired embedded feature 408 coverage.

In this example, each of the embedded features 408 extends for a length 416, such a radial length 416 relative to axis 405. Because one or more of the embedded features 408 may extend radially and continuously between the outer diameter 404 and the inner diameter 406 as previously described, one or more of the embedded features 408 may have a length 416 that is approximately equal to a radial distance between the inner diameter 406 and the outer diameter 404. In addition, because one or more of the embedded features 408 may be spaced radially from one or both of the outer diameter 404 and the inner diameter 406 (thereby resulting in gaps 410) as previously described, in some embodiments, one or more of the length 416 may be less than a radial distance between the inner diameter 406 and the outer diameter 404.

In some embodiments (such as the embodiment shown in FIG. 4A), the embedded features 408 are generally rectangular in shape. It should be appreciated that in other embodiments, the embedded features 408 may have different shapes such as, for instance, square, arcuate, triangular, octagon, hexagonal, or any other suitable shape (FIG. 4G discussed in more detail below). Moreover, different embedded features 408 may have different shapes along the same strike face (strike face 400A) in some embodiments.

Figure 4B:
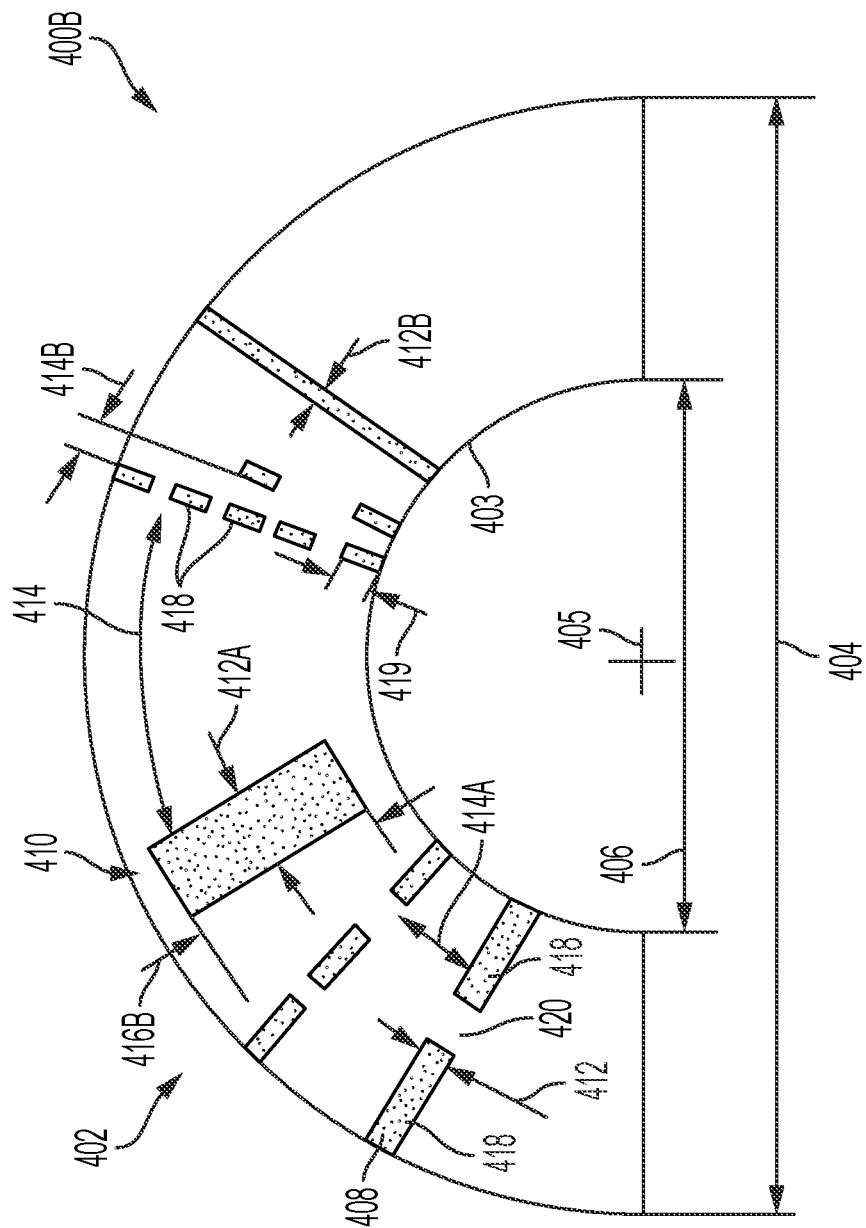

FIG. 4B is a top plan view of an embodiment of a strike face 400B including an embedded structure 402 (for example a discontinuous embedded structure) formed from or defined by a number of embedded features 408. As noted above, the individual components (such as individual embedded features 408) may individually be called embedded structures or entire groupings of individual components (such as groupings of embedded features 408) may be called embedded structures. In this example, the embedded structure 402 illustrates a set of circumferentially distributed embedded features 408 that extend radially relative to the central axis 405 from the inner diameter 406 to the outer diameter 404. In some embodiments, one or more of the embedded features 408 may include a plurality of radially spaced individual segments 418 positioned radially between the outer diameter 404 and inner diameter 406. Thus, each of the segments 418 may have spaces or discontinuities 420 are arranged radially therebetween. The segments 418 may each include a radial length 419 extending along a radius of central axis 405. A total radial length or span of segments 418 of a corresponding embedded feature 408 may correspond to the radial length 416 of that embedded feature 408 as previously described. A group of the segments 418 may be referred to as an embedded feature of the embedded structure 402, or alternatively, each of one or more of the segments 418 may be referred to individually as an embedded feature of the embedded structure 402.

As shown, the number and arrangement of embedded features 408 (including the segments 418) may be particularly selected based, at least in part, on expected design conditions and/or manufacturing capabilities. Additionally, a single strike face 400B may have different areas or regions that have different numbers of embedded features 408 and/or segments 418. As noted above, the number and configuration of the segments 418, the respective lengths 416, the respective widths 412, and the like may all be particularly selected such that about 5% to about 95% of a total surface area of the strike face 400B is occupied or defined by the embedded structure 402.

The illustrated example also shows various configurations between different widths 412A, 412B, different spacings 414A, 414B, different radial lengths 416A, 416B, different radial lengths 419 of segments 418, and differently sized spaces 420 (specifically a radial length of the spaces 420 for the radially extending embedded features 408 of FIG. 4B). Accordingly, as noted, various configurations of the present disclosure enable a particularly designed strike face 400B that may incorporate one or more different configurations over different portions of the valve. As a result, regions of the strike face 400B that may have a higher likelihood of impact or damage, such as regions closer to the inner diameter 406, may have more embedded features 408 (or segments 418) than other regions, such as a central region that is radially spaced between the inner diameter 406 and outer diameter 404. In this manner, costs may be reduced by incorporating more expensive materials in areas of need, enabling different portions to be made with less costly materials. Additionally, as data is collected over time with respect to likely failure areas, different configurations may be developed based, at least in part, on information associated with operating conditions. For example, data collection may determine that particular types of proppant or fluids have a particular wear pattern, and as a result, different strike face designs may be developed for such a wear pattern, thereby providing a targeted solution for operators. The embodiment of FIG. 4B further shows incorporation of both the segmented embedded features 408 (having segments 418 and spaces 420) and the continuous embedded features 408 within a single strike face (such as strike face 400B) design, thereby further illustrating that reinforcement points may be localized or otherwise selected based on design conditions.

Figure 4C:
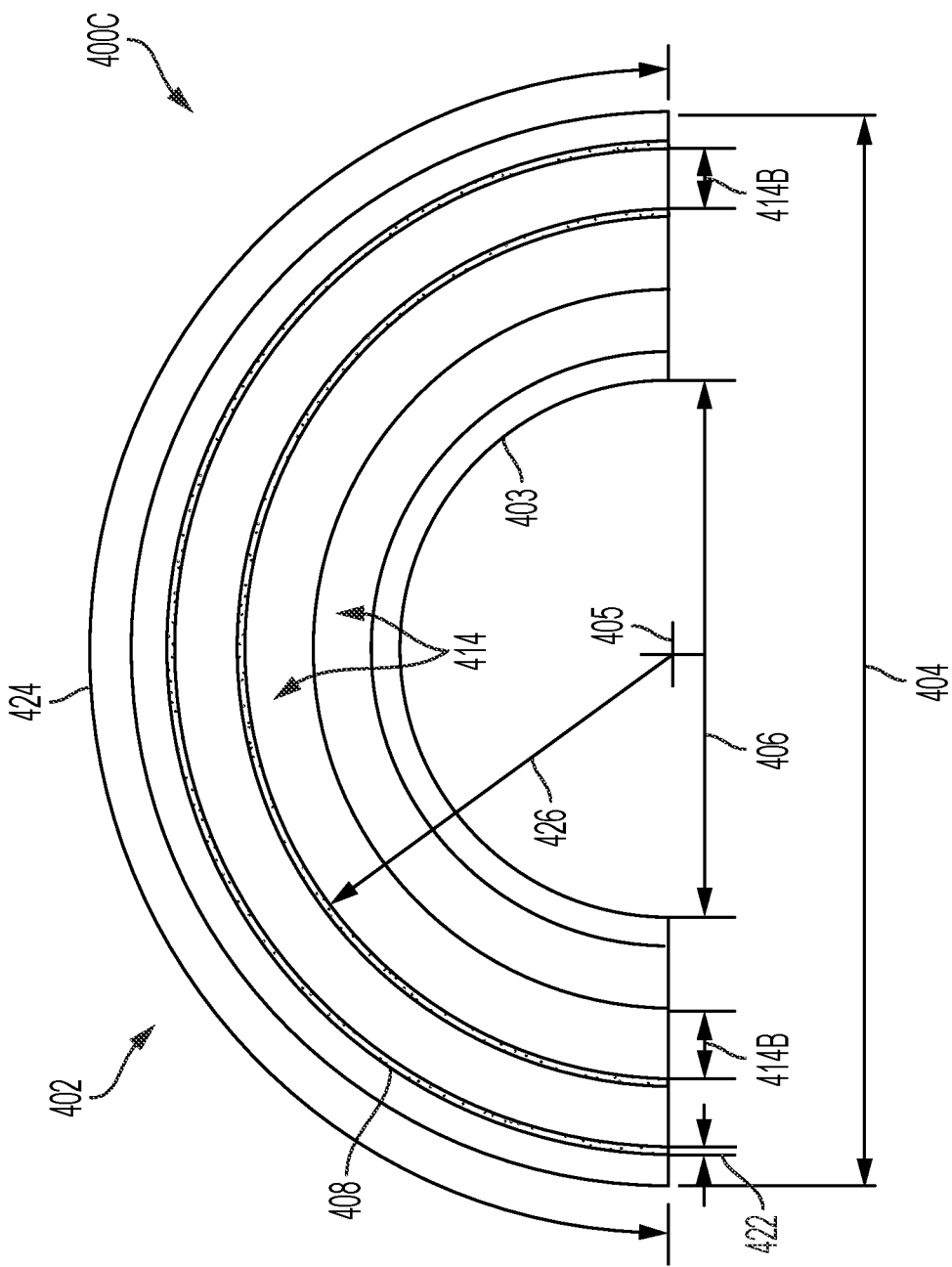

FIG. 4C illustrates a top plan view of an embodiment of a strike face 400C includes the embedded structure 402 having embedded features 408 arranged as radially spaced, circumferentially extending bands. As shown, the embedded features 408 have a curved or arcuate shape that substantially corresponds to the curvature of the valve seat about the axis 405. Thus, the embedded features 408 in FIG. 4C include elongated features extending in a circumferential direction about the central axis 405. The embedded features 408 may span the entire circumferential extent of the strike face 400C (such as 360° about the axis 405) or may only span over a portion of the circumferential extent (such as less than 360° about the axis 405), as will be illustrated herein. In this example, each embedded feature 408 includes a radial thickness 422, which may represent a radial distance the embedded features 408 extends relative to axis 405, with a larger thickness corresponding to a greater radial extent or span and a smaller thickness corresponding to a smaller radial extent or span. As shown in FIG. 4C, the embedded features 408 may have different radial thicknesses 422 such that each embedded features 408 has a different radial thickness 422 than the other embedded features 408 along strike face 400C. However, it should be appreciated that one or more of the embedded features 408 may the same radial thickness 422 in some embodiments. Moreover, in some embodiments, each embedded feature 408 of strike face 400C may have a uniform or constant radial thickness 422 along its entire circumferential span. However, it should be appreciated that one or more of the embedded features 408 of strike face 400C may have a variable or changing radial thickness 422 along their circumferential span.

In some embodiments (such as the embodiment shown in FIG. 4C), the embedded features 408 are radially separated by spaces 414, where spaces 414 between different embedded features 408 may have the same or different radial lengths along the strike face 400C. For example, FIG. 4C shows a first space 414A radially between a first radially adjacent pair of the embedded features 408 that is larger than a second space 414B radially between a second radially adjacent pair of embedded features 408 as shown in FIG. 4C. It should be appreciated that the spaces 414 may be uniform in various embodiments and/or may be particularly selected to emphasize or otherwise position more embedded features 408 in particular areas. For example, spaces 414 proximate the inner diameter 406 (or more proximate the inner diameter 406 than the outer diameter 404 along a radial direction relative to axis 405) may be smaller to accommodate more embedded features 408 proximate the inner diameter 406, which may be an area that experiences greater wear or damage. As a result, the embedded structure 402 may be arranged and configured such that the strike face (such as the strike face 400C) may have a greater percentage coverage (or higher concentration) of embedded features 408 in the particular region proximate the inner diameter 406 (or more proximate the inner diameter 406 than the outer diameter 404 along a radial direction relative to axis 405) than other regions or portions of the strike face (such as the 400C).

The embedded features 408 may further include a circumferential length 424 relative to axis 405, which in this example corresponds to a distance (e.g., an arc length) of the embedded features 408. For example, the circumferential length 424 of an embedded feature 408 may correspond to a circumferential distance (or circumference) about the axis 405 when the embedded feature 408 extends a full 360° about the axis 405 along the strike face 400C. In contrast, the circumferential length 424 of an embedded feature 408 may be less than a full circumference when the embedded feature 408 extends less than a full 360° about the axis 405 along the strike face 400C. It should be appreciated that different embedded features 408 may have different circumferential lengths, and moreover, may be divided into circumferentially spaced segments, as will be illustrated below.

FIG. 4C further illustrates a radial distance 426 from the axis 405 to a radial innermost edge of each of the embedded features 408. The radial distance 426 may be smaller for embedded features 408 that are relatively closer to the inner diameter 406 and may be larger for embedded features 408 that are relatively farther from inner diameter 406 (and thus relatively closer to outer diameter 404). As indicated above, in some embodiments, the radial distances 426 and the spaces 414 of the embedded features 408 of the embedded structure 402 may be particularly selected to position or otherwise concentrate the embedded features 408 in certain regions of the strike face 400C.

Figure 4D:
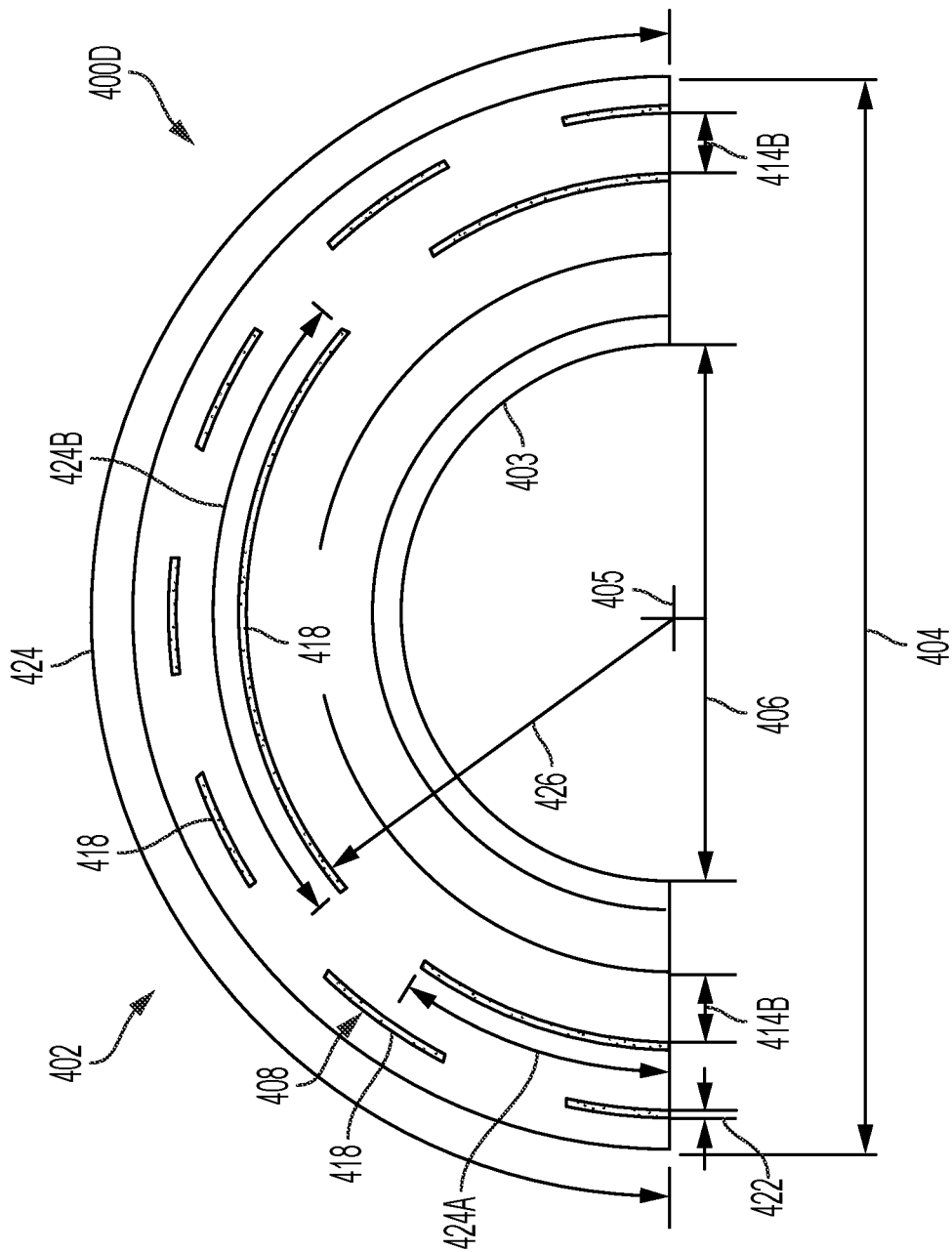

FIG. 4D is a top plan view of an embodiment of a strike face 400D illustrating circumferentially extending embedded features 408. In this example, one or more of the embedded features 408 are separated into circumferentially spaced segments 418 that are circumferentially separated by discontinuities or spaces 420 along a common circumferential path relative to axis 405. As a result, respective circumferential lengths 424 of each segment 418 of a segmented embedded feature are less than 360°, and in some cases may vary along a particular circumferentially extending embedded feature 408. For example, the first circumferential length 424A of a first segment 418 may be different (such as less) from a second circumferential length 424B of a second segment 418 for a particular embedded feature 408 of the embedded structure 402. As noted above, such a configuration may be particularly selected based, at least in part, on various expected operating conditions as well as design or manufacturing constraints, among other considerations. As was previously described for the segments 418 of the radially extending embedded features 408 in FIG. 4B, a group of the segments 418 of the circumferentially extending embedded features 408 of FIG. 4D may be referred to as an embedded feature of the embedded structure 402, or alternatively, each of one or more of the segments 418 of the circumferentially extending embedded features 408 of FIG. 4D may be referred to individually as an embedded feature of the embedded structure 402.

In this example, a total number of segments 418 is shown to vary within different circumferential embedded features 408. For example, one of the embedded features 408 (such as a radially outer most embedded feature 408) includes seven circumferentially spaced segments 418 along the illustrated half of the strike face 400D, while another of embedded features 408 includes three circumferentially spaced segments 418 along the illustrated half of the strike face 400D, still another of the embedded features 408 includes two circumferentially spaced segments 418 along the illustrated half of the strike face 400D, and still yet another of the embedded features 408 (such as the radially inner most embedded feature 408) has a single, continuous segment along the illustrated half of the strike face 400D (such as is the case for the circumferential embedded features 408 shown for the strike face 400C shown in FIG. 4C). It should be appreciated that the number, size, and spacing of embedded features 408, the number, size, and spacing of the segments 418, the circumferential lengths 424, the spaces 414, and various other features may be varied and particularly selected based on expected operating conditions. Accordingly, embodiments herein are shown for illustrative purposes and are not intended to be limiting.

Figure 4E:
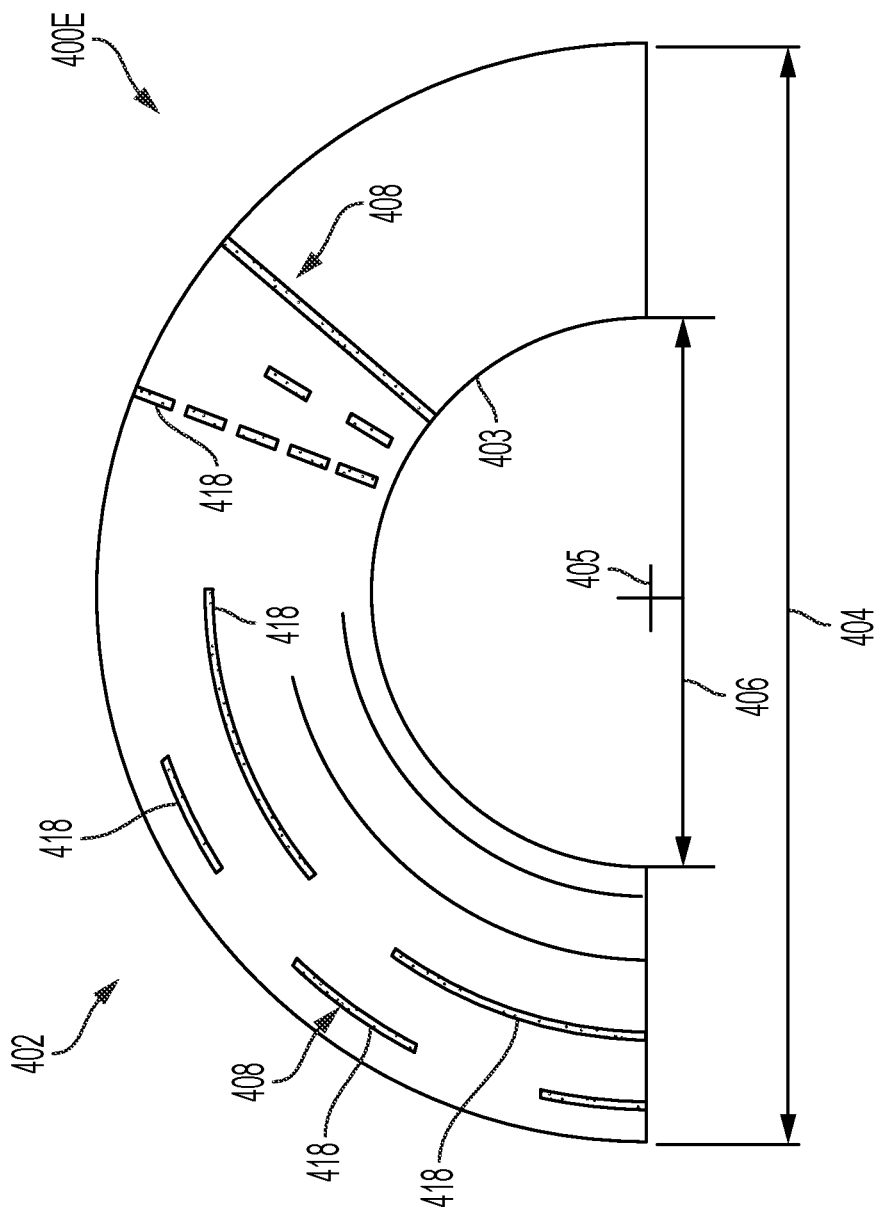

FIG. 4E is a top plan view of an embodiment of a strike face 400E illustrating both circumferential and radial embedded features 408. As shown in FIG. 4E, the embedded features 408 may have a variety of configurations, such as circumferentially spaced and/or radially spaced segments 418 as previously described. Accordingly, embodiments of the present disclosure may combine various features in order to generate strike faces designed for use with a variety of operating conditions or to accommodate a variety of different manufacturing techniques.

Figure 4F:
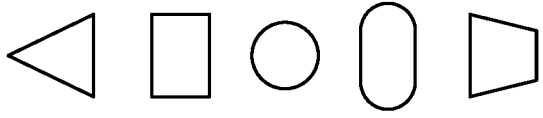
Figure 4F:
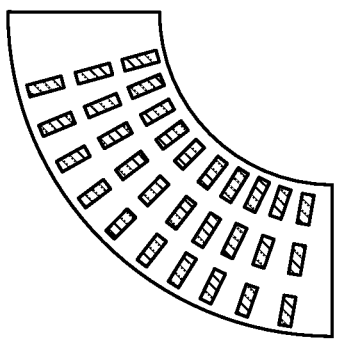
Figure 4F:
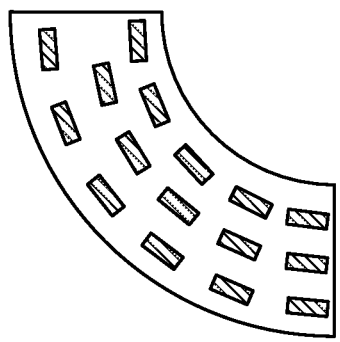
Figure 4F:
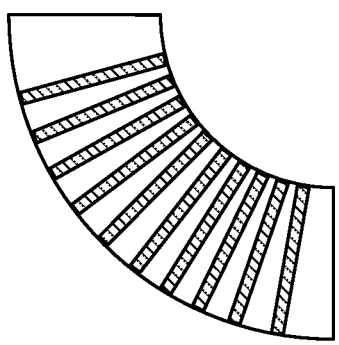
Figure 4F:
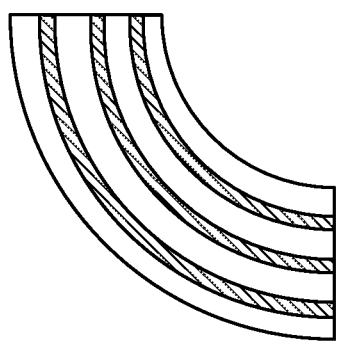
Figure 4G:
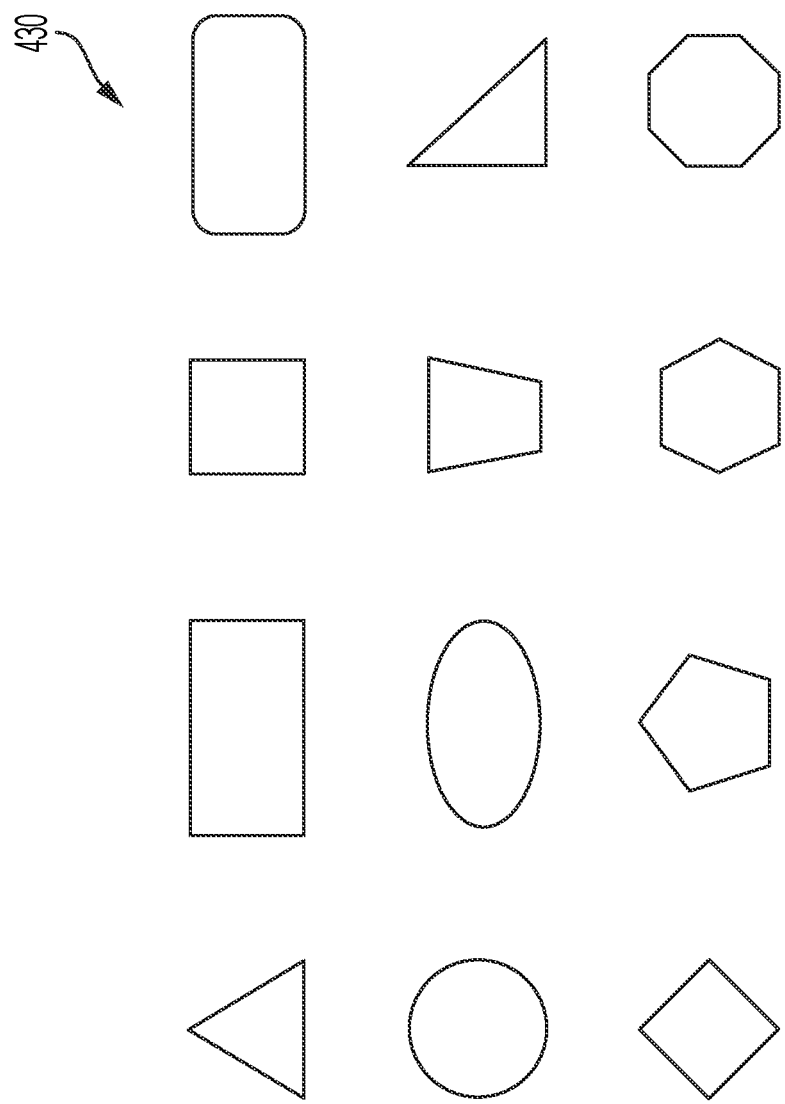
FIG. 4G are top views of geometric profiles that may be utilized as embodiments of embedded features of an embedded structure of a strike face in accordance with embodiments of the present disclosure.

FIG. 4F shows top plan views further illustrating embodiments of strike faces 400 which may be used with embodiments of the present disclosure.

FIG. 4G illustrates top views of a set of potential geometric profiles 430 that may be utilized as embodiments of the embedded features 408 (or the segments 418) of the embedded structure 402. For instance, one or more of the radial embedded features 408 (FIG. 4A), radially spaced segments 418 (FIG. 4B), circumferential embedded features 408 (FIG. 4C), or circumferentially spaced segments 418 (FIG. 4D) may include any of the geometric profiles 430 shown in FIG. 4G according to some embodiments. In some embodiments, the different geometric profiles 430 may include triangles, rectangles, squares, circles, ovals, trapezoids, diamonds, pentagons, octagons, hexagons, and various other geometric shapes. It should be appreciated that different configurations may utilized different geometric profiles 430, which may be mixed or otherwise utilized with other geometric profiles, such as having different segments 418 within a common embedded feature 408. Various features of the geometric profiles, such as height, side lengths, interior angles, and the like, may be particularly selected based on design conditions or manufacturability.

Figure 5B:
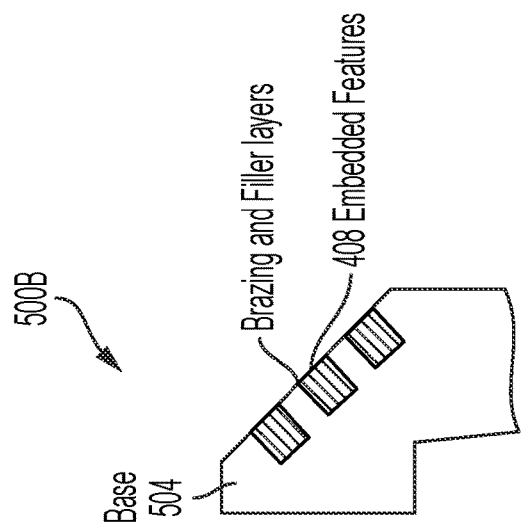
Figure 5C:
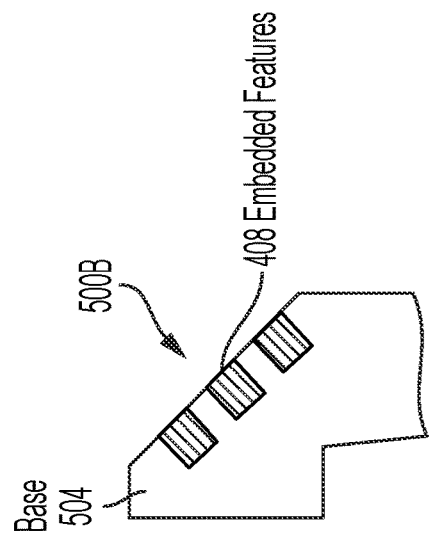
Figure 5A:
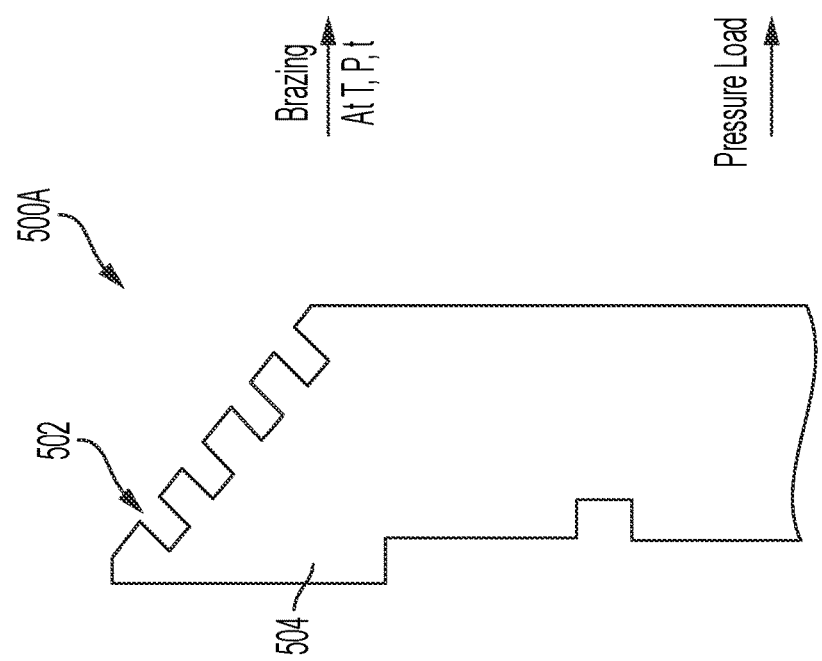

FIG. 5A is a side-view of an embodiment of a valve seat 500A including recesses 502 that may receive one or more embedded features (e.g., embedded features 408 previously described). As previously described, the embedded features 408 may each comprise a GMS such that each embedded feature 408 may include the regions 320, 322, 324, 326, 328 previously described above for the GMS 316 of valve seat 300 shown in FIGS. 3A and 3B. In this configuration the recesses 502 are shown in a configuration that would include a plurality of embedded features 408, but it should be appreciated that the arrangement of the recesses 502 is for illustrative purposes only and that, in various embodiments, more or fewer recesses 502 may be included, as well as recesses having different dimensions corresponding to features (such as the gaps 410, widths 412, spaces 414, lengths 416, spaces 420, thicknesses 422, circumferential lengths 424, etc. shown in FIGS. 4A-4E).

As shown, the valve seat 500A is formed of a base material 504, which may be a steel or other material, as noted above. The base material 504 may be a cheaper or easier to obtain material, and as a result, may have lower resistance to abrasion and wear as a higher cost or engineering material, such as the materials described herein. In various embodiments, the embedded features may be inserted into the recesses 502 to define the strike face 400 of the valve seat 500A, as described above.

FIG. 5B illustrates a side view of an embodiment of a valve seat 500B formed using a brazing process. In this example, the recesses 502 are filled with embedded features 408 and the brazing process joins the embedded features 408 to the base material 504.

FIG. 5C illustrates a side view of an embodiment of a vale seat 500C formed using a mechanical press-fit process. In this example, embedded features 408 are pressed or pressure loaded into the recesses 502 to form the completed component.

Figure 5D:
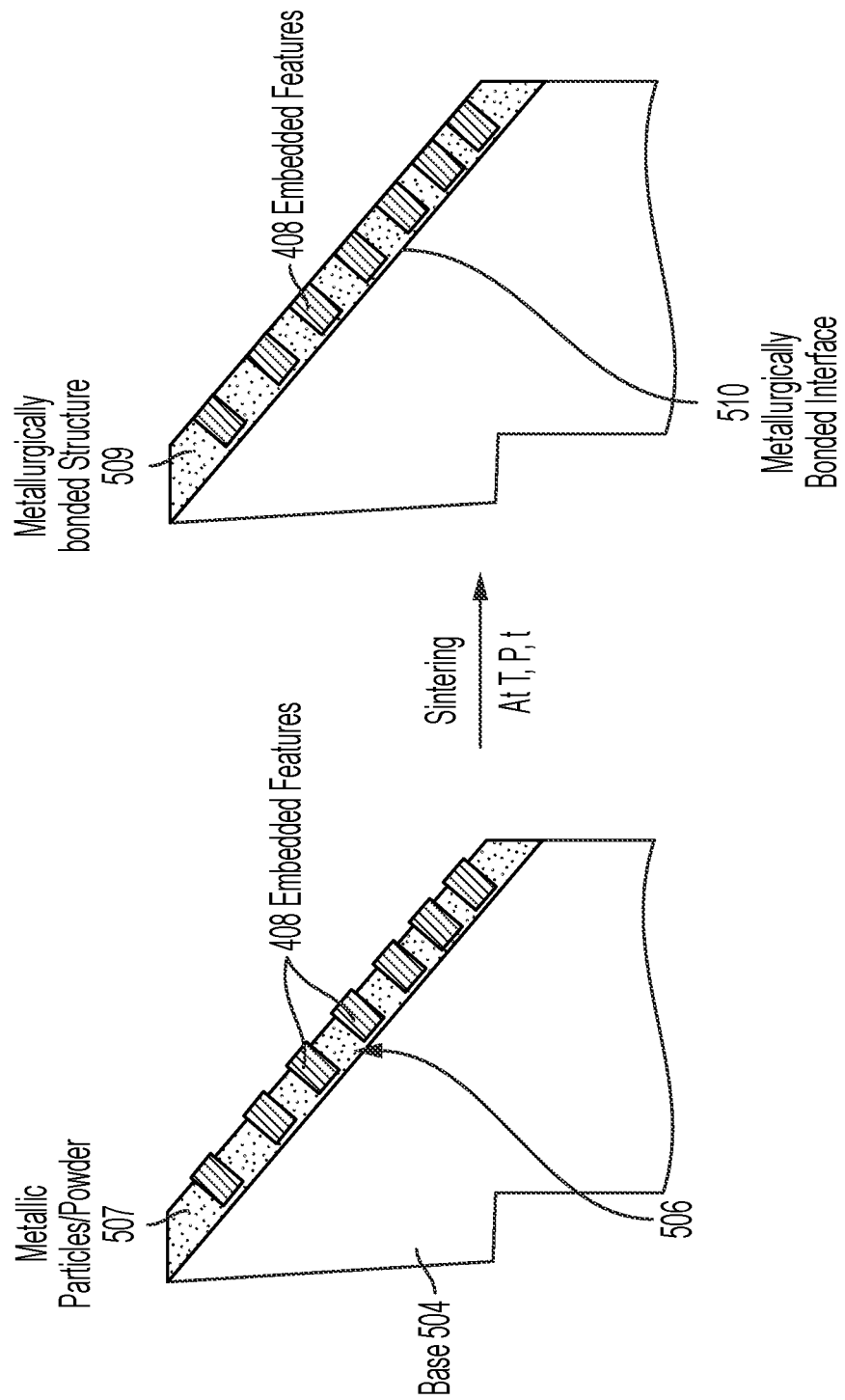

FIG. 5D illustrates a side view of an embodiment of the valve seat 500D using a sintering process. Embedded features 408 may be arranged or pre-positioned according to a desired configuration. In some embodiments, the embedded features 408 may be arranged on the valve seat so as to facilitate formation of the strike face of the valve seat and bonding to the valve seat in a single sintering step as described in more detail below. Once the embedded features 408 are arranged as desired, sintering metallic powder (or powders) 507 are placed to fill (or at least partially fill) gaps 506 between embedded features 408 and are sintered at a specified temperature and pressure for a selected time to generate or form a metallurgically bonded structure 509 (or more simply "bonded structure") that includes the embedded features 408 and metallic powder 507 (which are now coalesced into a solid metallic material). The metallurgically bonded structure 509 may be bonded to the base material 504 of the valve seat at a metallurgically bonded interface 510 (or more simply "interface 510") between the base material 504 and the bonded structure 509. In some embodiments, the bonded structure 509 may be bonded to the base material 504 of during the sintering process such that the metallic powder 507 and/or the embedded features 408 may both coalesce to form the bonded structure 509 and bond to the base material 504 along the interface during the same manufacturing step (sintering). In some embodiments, the bonded structure 509 may be bonded to the base material 504 of the valve seat via a separate process and/or manufacturing step. For instance, the bonded structure 509 may be bonded to the base material 504 via a separate sintering step or via welding, adhesive, brazing, or some combination thereof.

As previously described, each of the embedded features 408 included in the bonded structure 509 may comprise a GMS and may include regions (such as regions 320, 322, 325, 326, 328 shown in FIG. 3B) from an exterior surface of progressively decreasing percentages of HEA, MEA, HEC, MEC, or some combination thereof to a core material, which may be the same material as the base 504. Thus, the embedded features 408 may have the same material as the material of the base 504 at the metallurgically bonded interface so that embedded features 408 are secured to base 504 along with the coalesced metallic powder 507. Accordingly, the sintering/embedded features are held in position on the base material 504. It should be appreciated that extra sintering powder 507 may be used to compensate for shrinkage of the powder 507. Moreover, various post-sintering machining processes may be used to generate a final product. In some embodiments, the sintering powder 507 may form a substantially homogeneous material with the base 504 of the valve seat following the sintering process.

FIG. 5E illustrates a side view of an embodiment of the valve seat 500E formed via a thermal shrink fit process. Shrink fitting may refer to a bonding technique where thermal expansion and contraction effects used to achieve an interference fit between two or more components. For example, a part may be heated so that it undergoes thermal expansion, then a piece may be arranged within an opening or void, and as the part cools, it may contract and secure the piece within the void. In this example, the base material 504 may include the recesses 502 and may be heated to undergo thermal expansion. The embedded features 408 may then be arranged within the recesses 502, such as via an interference fit. As the base material 504 cools, the embedded features 408 may be secured within the recesses 502.

The coefficient of thermal expansion of a WC alloy is ⅓ to ½ of steel seat base. This can be used to mount the carbide embedded structure into steel base by an interference fit. The thermal shrink fit creates a compressive force on the carbide embedded feature. The high compressive strength of carbides makes it well suited to the compressive loading encountered with shrinking.

The amount of interference depends entirely on the requirements of the application. For valve seat in a hydraulic fracture pump application, a high amount of interference and compressive loading on the carbide embedded feature may be acceptable to reduce or eliminate stress reversal during high pulsation pressure cycles. The typical range of the interference of the thermal shrink fit for carbide embedded feature into steel base of the valve seat is from 0006—.0025", and more typically in range of 0008 to. 0015".

The assembling temperature for a thermal shrink fit of the carbide embedded into steel base of the valve seat is in the range of 200 to 500° F., more typically 300-450° F.

Figure 6:
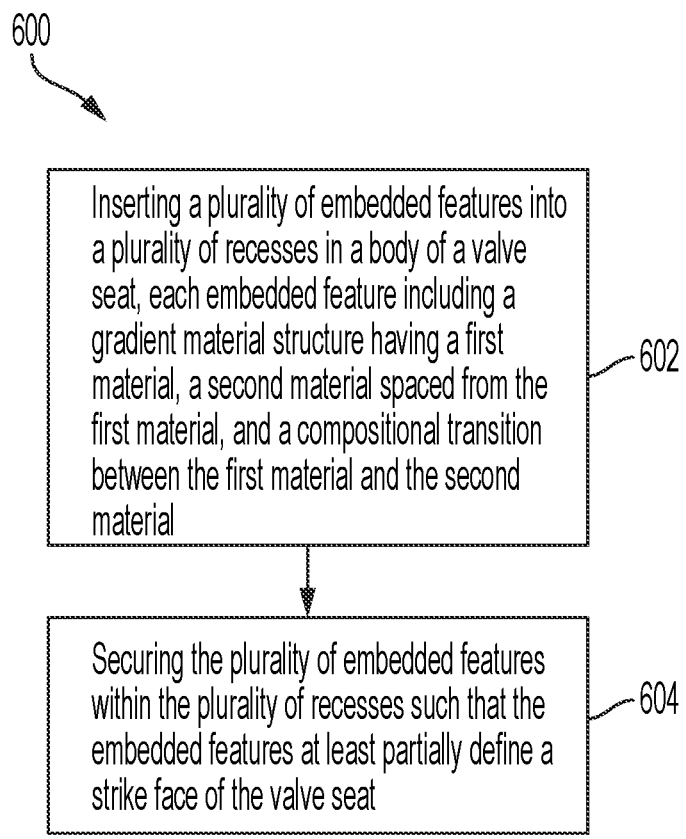
FIGS. 6 and 7 are diagrams of methods of forming a strike face of a body of a valve seat, in accordance with embodiments of the present disclosure.

FIG. 6 is a diagram of a method 600 of forming a strike face of a body of a valve seat of a pumping assembly according to some embodiments of the disclosure. In some embodiments, embodiments of method 600 may be performed to form strike faces (or wear faces) on structures or components for other applications, other than valve seats (such as plungers, mixer blades, and the like that may be utilized within frac pumps, mud pumps, wastewater pumps, sand blenders and mixers, earth moving and mining equipment, harvester blades, wind energy turbine blades, and the like). Thus, the specific application of embodiments of method 600 for forming a strike face on a valve seats shown in FIG. 6 and described herein is merely illustrative of some applications of embodiments of method 600.

Initially, method 600 includes inserting a plurality of embedded features into a plurality of recesses in a valve seat at block 602. Each embedded feature includes a gradient material structure having a first material, a second material spaced from the first material, and a smooth compositional transition or transition region between the first material and the second material. For instance, in some embodiments, the gradient material structure at block 602 may include the GMS 316 shown in FIG. 3 and described herein. Thus, in some embodiments, the first material at block 602 may include a resistant material such as, for instance HEA, MEA, HEC, MEC, or some combination thereof. In some embodiments, the second material at block 602 may include a core or base material that is also used to form the valve seat.

Method 600 may also include, at block 604, securing the plurality of embedded features within the plurality of recesses such that the embedded features at least partially define the strike face. In some embodiments, the embedded features may be secured within the recesses via a brazing process (FIG. 5B), a press-fit process (FIG. 5C), a thermal shrink fit process (FIG. 5E) or via any other suitable process. In some embodiments, blocks 602 and 604 may include forming the plurality of recesses and securing the plurality of embedded features within the plurality of recesses via a sintering process such as previously described above and illustrated by FIG. 5D.

As previously described, the specific position, arrangement, spacing, sizes, etc. of the recesses and embedded features defining the strike face of the valve seat of method 600 may be selected based on various design and operational conditions. For instance, particular regions or portions of the strike face may experience greater loads and stresses during operations, and thus, a greater number and/or concentration of embedded features (and thus recesses) may be positioned within these regions or portions in some embodiments. The various spacings, sizes, and positions (such as the gaps 410, widths 412, spaces 414, lengths 416, spaces 420, thicknesses 422, circumferential lengths 424, etc. shown in FIGS. 4A-4E) may be utilized to provide a desired number and/or concentration of the embedded features within the regions or portions of the strike face that may experience relatively greater loads and/or stresses during operations.

It should be appreciated that various embodiments of the present disclosure may further incorporate bonding agents or adhesives. For example, bonding agents or adhesives may be used for interference shrink or press fit operations in order to increase the bonding strength of the embedded features and the steel base. Various embodiments may incorporate adhesives including but not limited to, anaerobic, acrylic, cyanoacrylate, thixotropic urethane, etc.

Figure 7:
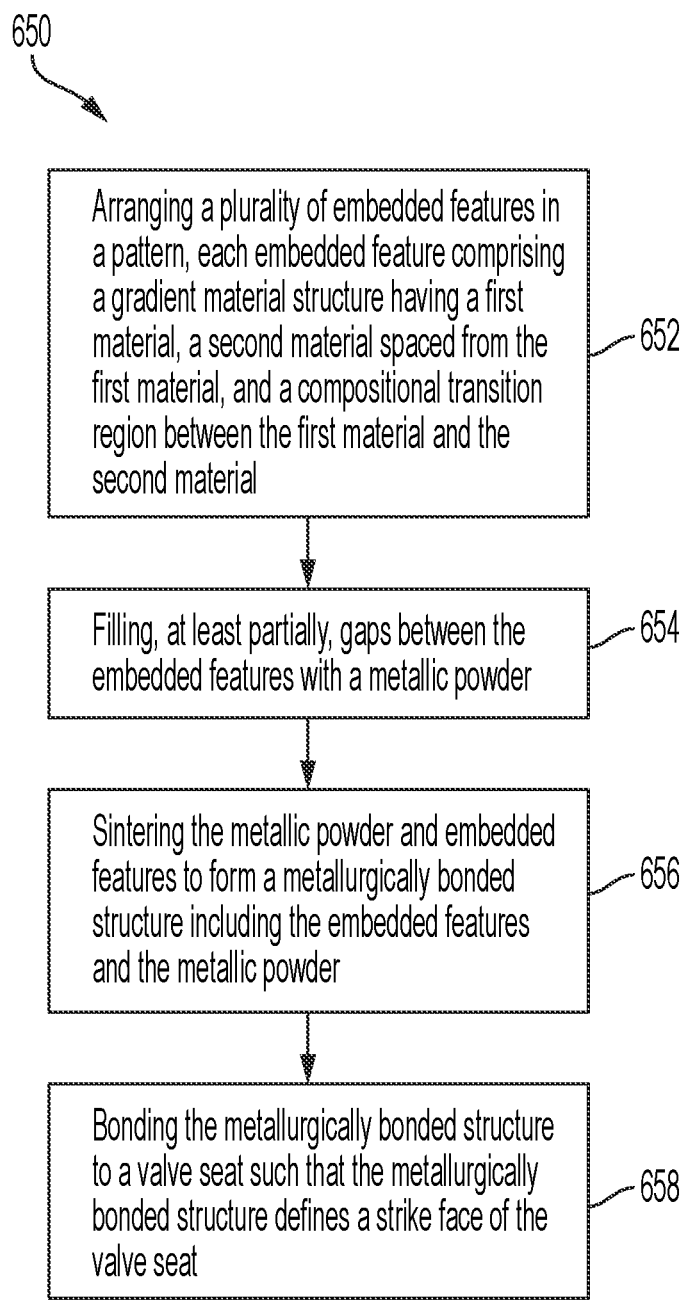

FIG. 7 is a diagram of a method 650 of forming a strike face of a body of a valve seat of a pumping assembly according to some embodiments of the disclosure. In some embodiments, embodiments of method 650 may be performed to form strike faces (or wear faces) of structures or components for other applications, other than valve seats (such as plungers, mixer blades, and the like that may be utilized within frac pumps, mud pumps, wastewater pumps, sand blenders and mixers, earth moving and mining equipment, harvester blades, wind energy turbine blades, and the like). Thus, the specific application of embodiments of method 650 for forming a strike face on a valve seats shown in FIG. 7 and described herein is merely illustrative of some applications of embodiments of method 650.

Initially, method 650 includes arranging a plurality of embedded features in a desired pattern at block 652. Each embedded feature includes a gradient material structure having a first material, a second material spaced from the first material, and a compositional transition or transition region between the first material and the second material. For instance, in some embodiments, the gradient material structure at block 652 may include the GMS 316 shown in FIG. 3 and described herein. Thus, in some embodiments, the first material at block 652 may include a resistant material such as, for instance HEA, MEA, HEC, MEC, or some combination thereof. In some embodiments, the second material at block 652 may include a core or base material that is also used to form the valve seat. The desired pattern may include any one or more of the patterns of embedded features 408 shown in FIGS. 4A-4E and/or described herein.

In addition, method 650 includes filling, at least partially, gaps between the embedded features with a metallic powder at block 654. In some embodiments, the metallic powder may be the same or substantially the same as a base material of a valve seat. As shown in FIG. 5D, a metallic powder 507 is used to fill (or at least partially fill) gaps 506 formed between the arranged embedded features 408.

Further, the method 650 includes sintering the metallic powder and the embedded features to form a metallurgically bonded structure including the embedded features and the metallic powder at block 656. For instance, the sintering process may involve compressing the metallic powder and embedded features at high pressure and high temperature to coalesce the metallic powder and embedded features 408 into a solid metallurgically bonded structure (such as bonded structure 509 previously described).

Still further, method 650 includes bonding the metallurgically bonded structure to a valve seat such that the metallurgically bonded structure defines a strike face of the valve seat at block 658. In some embodiments, the metallurgically bonded structure may be bonded to the valve seat as a result of and during the sintering in block 656. Thus, in some embodiments, block 652 may include arranging the plurality of embedded features in the desired pattern on the valve seat, and block 654 may include filling (at least partially) gaps between the embedded features with the metallic powder on the valve seat. In some embodiments, the metallurgically bonded structure may be bonded to the valve seat during a separate manufacturing step from the sintering in block 656, such as for instance as a result of a separate sintering step or via welding, adhesive, brazing, or some combination thereof.

This application claims the benefit of and priority to U.S. Provisional Patent Application No. 63/316,766, filed Mar. 4, 2022, and titled "Valve with a Discontinuous Material Surface Structure," the contents of which are incorporated herein by reference in their entirety.

The foregoing disclosure and description of the disclosed embodiments is illustrative and explanatory of the embodiments of the disclosure. Various changes in the details of the illustrated embodiments can be made within the scope of the appended claims without departing from the true spirit of the disclosure. The embodiments of the present disclosure should only be limited by the following claims and their legal equivalents. As will be described above, in one or more embodiments the packing sleeve 220 is secured to the block 104 using one or more fasteners that may extend through one or more intermediate components. In at least one embodiment, a retaining system may not include a preload element.

The invention claimed is:

1. A valve seat for a pumping assembly, the valve seat comprising:
a body including a bore; and
an embedded structure embedded in the body so as to define, at least partially, a strike face of the valve seat, the strike face extends circumferentially about the bore, and the embedded structure includes a gradient material structure having a first material, a second material spaced from the first material, and a compositional transition region between the first material and the second material, the embedded structure comprising a plurality of separate embedded features embedded in the body, each of the embedded features including the gradient material structure, and one or more of the plurality of separate embedded features comprising an elongated feature extending in a radial direction relative to a central axis of the bore along the strike face.

2. The valve seat of claim 1, wherein the compositional transitional region includes continuous compositional change from the first material to the second material to avoid a sharp mismatch therein of one or more of (a) thermal properties or (b) mechanical properties.

3. The valve seat of claim 1, wherein the compositional transition region comprises a plurality of regions, and wherein a concentration of the first material relative to a concentration of the second material decreases in each of the plurality of regions as the compositional transition region extends between the first material and the second material.

4. The valve seat of claim 3, wherein the first material defines an exterior surface of the embedded structure along the strike face, and wherein mechanical and thermal properties of the gradient material structure smoothly transition as the compositional transition region extends between the exterior surface and the second material.

5. The valve seat of claim 1, wherein the embedded structure is bonded to the body.

6. The valve seat of claim 1, wherein the first material of the gradient material structure has a fracture toughness in a range of 60 to 200 MPa $(m)^{1/2}$ and a Vickers hardness in a range of 800 HV to 1400 HV.

7. The valve seat of claim 6, wherein the embedded structure has a thickness in a range from about 0.05 millimeters (mm) to about 10 mm.

8. The valve seat of claim 1, wherein the embedded structure covers between 5% and 95% of a surface area of the strike face.

9. The valve seat of claim 1, wherein the one or more of the plurality of separate embedded features comprises a plurality of radially spaced segments.

10. A valve seat for a pumping assembly, the valve seat comprising:
a body including a bore; and an embedded structure embedded in the body so as to define, at least partially, a strike face of the valve seat, the strike face extends circumferentially about the bore, and the embedded structure includes a gradient material structure having a first material, a second material spaced from the first material, and a compositional transition region between the first material and the second material, the embedded structure comprising a plurality of separate embedded features embedded in the body, each of the embedded features including the gradient material structure, and at least one of the one or more of the plurality of separate embedded features comprising an elongated feature extending in a circumferential direction about a central axis of the bore along the strike face.

11. The valve seat of claim 10, wherein at least one of the one or more of the plurality of separate embedded features comprises a plurality of circumferentially spaced segments.

12. The valve seat of claim 10, wherein the compositional transition region comprises a plurality of regions, and wherein a concentration of the first material relative to a concentration of the second material decreases in each of the plurality of regions as the compositional transition region extends between the first material and the second material.

13. The valve seat of claim 12, wherein the first material defines an exterior surface of the embedded structure along the strike face, and wherein mechanical and thermal properties of the gradient material structure smoothly transition as the compositional transition region extends between the exterior surface and the second material.

14. The valve seat of claim 10, wherein the embedded structure is bonded to the body.

15. A valve seat for a pumping assembly, the valve seat comprising:
a body including a bore; and
an embedded structure embedded in the body so as to define, at least partially, a strike face of the valve seat, the strike face extends circumferentially about the bore, and the embedded structure includes a gradient material structure having a first material, a second material spaced from the first material, and a compositional transition region between the first material and the second material, the embedded structure comprising a plurality of separate embedded features embedded in the body, each of the embedded features including the gradient material structure, and a first region of the strike face having a higher concentration of the plurality of separate embedded features than a second region of the strike face, and the first region being positioned radially closer to the bore than the second region relative to a central axis of the bore.

16. The valve seat of claim 15, wherein the plurality of separate embedded features are distributed isometrically along the strike face.

17. The valve seat of claim 15, wherein the compositional transition region comprises a plurality of regions, and wherein a concentration of the first material relative to a concentration of the second material decreases in each of the plurality of regions as the compositional transition region extends between the first material and the second material.

18. The valve seat of claim 17, wherein the first material defines an exterior surface of the embedded structure along the strike face, and wherein mechanical and thermal properties of the gradient material structure smoothly transition as the compositional transition region extends between the exterior surface and the second material.

19. The valve seat of claim 15, wherein the embedded structure is bonded to the body.

20. A valve seat for a pumping assembly, the valve seat comprising:
a body including a bore; and
an embedded structure embedded in the body so as to define, at least partially, a strike face of the valve seat, the strike face extends circumferentially about the bore, and the embedded structure includes a gradient material structure having a first material, a second material spaced from the first material, and a compositional transition region between the first material and the second material, the embedded structure comprising a plurality of separate embedded features embedded in the body, each of the embedded features including the gradient material structure, and the strike face including spaces located between the plurality of separate embedded features including a base material of the body.

21. The valve seat of claim 20, wherein the first material of the gradient material structure includes one or more of a high entropy alloy, a medium entropy alloy, a high entropy ceramic, a medium entropy ceramic, or a cermet.

22. The valve seat of claim 21, wherein the high entropy alloy includes one or more of tungsten, vanadium, niobium, molybdenum, tantalum, iron, cobalt, manganese, chromium, or nickel.

23. The valve seat of claim 20, wherein the compositional transition region comprises a plurality of regions, and wherein a concentration of the first material relative to a concentration of the second material decreases in each of the plurality of regions as the compositional transition region extends between the first material and the second material.

24. The valve seat of claim 23, wherein the first material defines an exterior surface of the embedded structure along the strike face, and wherein mechanical and thermal properties of the gradient material structure smoothly transition as the compositional transition region extends between the exterior surface and the second material.

25. The valve seat of claim 20, wherein the embedded structure is bonded to the body.

26. A valve seat strike face comprising:
a first portion including a base material of a body of a valve seat; and
a second portion including an embedded structure embedded into the body, the embedded structure comprising a gradient material structure having a first material, a second material spaced from the first material, and a compositional transition region between the first material and the second material, one or more of the plurality of separate embedded features comprising:
(a) an elongated feature extending in a radial direction relative to a central axis of a bore of the valve seat, and
(b) a plurality of radially spaced segments.

27. The valve seat strike face of claim 26, wherein the compositional transitional region includes continuous compositional change from the first material to the second material to avoid a sharp mismatch therein of one or more of (a) thermal properties or (b) mechanical properties therein.

28. The valve seat strike face of claim 26, wherein the compositional transition region comprises a plurality of regions, and wherein a concentration of the first material relative to a concentration of the second material decreases in each of the plurality of regions as the compositional transition region extends between the first material and the second material.

29. The valve seat strike face of claim 28, wherein the first material defines an exterior surface of the embedded structure along the strike face, and wherein mechanical and thermal properties of the gradient material structure smoothly transition as the compositional transition region extends between the exterior surface and the second material.

30. The valve seat strike face of claim 26, wherein the embedded structure is bonded to the body of the valve seat.

31. The valve seat strike face of claim 26, wherein the first material of the gradient material structure has a fracture toughness in a range of 60 to 200 MPa(m)$^{1/2}$ and a Vickers hardness in a range of 800 HV to 1400 HV.

32. The valve seat strike face of claim 31, wherein the embedded structure may have a thickness in a range from about 0.05 millimeters (mm) to about 10 mm.

33. The valve seat strike face of claim 26, wherein the second material comprises the same material as the base material.

34. The valve seat strike face of claim 30, wherein the embedded structure covers between 5% and 95% of a surface area of the strike face.

35. The valve seat strike face of claim 30, wherein the first material comprises one or more of tungsten carbide, silicon carbide, boron carbide, Titanium carbide, vanadium carbide, alumina ($Al_2O_3$), Nitrides ($Si_3N_4$), Sialons ($Si_2ALON_3$), Zirconia ($ZrO_2$), super hard tool steels, FeMnCoCrC, AlCoCrFeNiTi, TiAlNiCoFe, VNbMoTaW, NiCrCoTiV, TiZrNbWMo, NiCrCoTiV, NbMoTaWVTi, NbMoTiCrVTa, MoNbTaW, HfNbTaTiZrN, or their composites.

36. The valve seat strike face of claim 26, wherein the embedded structure comprises a plurality of separate embedded features, and wherein each of the embedded features includes the gradient material structure.

37. The valve seat strike face of claim 26, wherein the embedded structure is discontinuously embedded into the body.

38. A valve seat strike face comprising:
a first portion including a base material of a body of a valve seat; and
a second portion including an embedded structure embedded into the body, the embedded structure comprising a gradient material structure having a first material, a second material spaced from the first material, and a compositional transition region between the first material and the second material, at least one of the one or more of the plurality of separate embedded features comprising:
(a) an elongated feature extending in a circumferential direction relative to a central axis of a bore of the valve seat, and
(b) a plurality of circumferentially spaced segments.

39. The valve seat strike face of claim 38, wherein the compositional transition region comprises a plurality of regions, and wherein a concentration of the first material relative to a concentration of the second material decreases in each of the plurality of regions as the compositional transition region extends between the first material and the second material.

40. The valve seat strike face of claim 39, wherein the first material defines an exterior surface of the embedded structure along the strike face, and wherein mechanical and thermal properties of the gradient material structure smoothly transition as the compositional transition region extends between the exterior surface and the second material.

41. The valve seat strike face of claim 38, wherein the embedded structure is bonded to the body of the valve seat.

42. A valve seat strike face comprising:
a second portion including an embedded structure embedded into the body, the embedded structure comprising a gradient material structure having a first material, a second material spaced from the first material, and a compositional transition region between the first material and the second material, the strike face extending circumferentially about a bore of the valve seat, a first region of the strike face having a higher concentration of the plurality of separate embedded features than a second region of the strike face, and the first region being positioned radially closer to the bore than the second region relative to a central axis of the bore.

43. The valve seat strike face of claim 42, wherein the compositional transition region comprises a plurality of regions, and wherein a concentration of the first material relative to a concentration of the second material decreases in each of the plurality of regions as the compositional transition region extends between the first material and the second material.

44. The valve seat strike face of claim 43, wherein the first material defines an exterior surface of the embedded structure along the strike face, and wherein mechanical and thermal properties of the gradient material structure smoothly transition as the compositional transition region extends between the exterior surface and the second material.

45. The valve seat strike face of claim 42, wherein the embedded structure is bonded to the body of the valve seat.

* * * * *